US011988037B2

(12) United States Patent
Chou

(10) Patent No.: US 11,988,037 B2
(45) Date of Patent: May 21, 2024

(54) WINDOW BLIND LIFTING AND TILTING SYSTEM

(71) Applicants: Tser Wen Chou, Yorba Linda, CA (US); Mason Chou, Irvine, CA (US)

(72) Inventor: Tser Wen Chou, Yorba Linda, CA (US)

( * ) Notice: Subject to any disclaimer, the term of this patent is extended or adjusted under 35 U.S.C. 154(b) by 11 days.

(21) Appl. No.: 17/830,300

(22) Filed: Jun. 1, 2022

(65) Prior Publication Data

US 2022/0396999 A1 Dec. 15, 2022

(30) Foreign Application Priority Data

Jun. 9, 2021 (TW) ................................ 110206689
Apr. 27, 2022 (TW) ................................ 111204349

(51) Int. Cl.
*E06B 9/322* (2006.01)
*E06B 9/326* (2006.01)
*E06B 9/327* (2006.01)

(52) U.S. Cl.
CPC .............. *E06B 9/322* (2013.01); *E06B 9/326* (2013.01); *E06B 9/327* (2013.01)

(58) Field of Classification Search
CPC . E06B 9/30; E06B 9/303; E06B 9/304; E06B 9/307; E06B 9/322; E06B 9/326; E06B 9/327; E06B 9/382; E06B 9/384; E06B 2009/2423; E06B 2009/2429; E06B 2009/2435; E06B 2009/3225; E06B 2009/3227; E06B 2009/2622; E06B 2009/2625; E06B 2009/2627
See application file for complete search history.

(56) References Cited

U.S. PATENT DOCUMENTS 1,808,455 A * 6/1931 Duncanson ............. E06B 9/304 160/171
1,848,742 A * 3/1932 Oulsman ................ E06B 9/304 160/171
2,244,094 A * 6/1941 Wread ..................... E06B 9/304 160/178.3
2,381,060 A * 8/1945 Kahn ...................... E06B 9/304 160/170
2,401,770 A * 6/1946 Nardulli .................. E06B 9/308 160/176.1 R
2,520,629 A * 8/1950 Esposito ................ E06B 9/304 160/171
2,738,005 A * 3/1956 Nisenson ................ E06B 9/304 160/170
2,831,536 A * 4/1958 Lorentzen ............... E06B 9/307 160/177 R
3,581,798 A * 6/1971 Malamed ................ E06B 9/304 160/176.1 R (Continued)

*Primary Examiner* — Johnnie A. Shablack
(74) *Attorney, Agent, or Firm* — J.H. Lin Patent Law P.C.; John H. Lin

(57) ABSTRACT

An apparatus for controlling tilting and lifting operation of a window blind is provided. The apparatus includes a tilting control shaft and a lifting control shaft. A ladder belt is fastened to the tilting control shaft and interconnects the slats of the window blind, such that rotating the tilting control shaft tilts the slats. Multiple lifting cords are fastened to the lifting control shaft and connected to the blind bottom of the window blind, such that rotating the lifting control shaft lifts or lowers the blind bottom and one or more slats.

18 Claims, 23 Drawing Sheets

(56) References Cited

U.S. PATENT DOCUMENTS 4,919,186 A * 4/1990 Uecker ..................... E06B 9/32 160/321
5,103,888 A * 4/1992 Nakamura .............. E06B 9/308 160/171
5,133,399 A * 7/1992 Hiller ........................ E06B 9/30 160/171
5,328,113 A * 7/1994 de Chevron Villette .................... E06B 9/308 242/388
5,582,226 A * 12/1996 Voss ........................ E06B 9/303 160/178.3
5,839,492 A * 11/1998 Young ..................... E06B 9/304 160/168.1 P
5,845,691 A * 12/1998 Gaines .................... E06B 9/307 160/115
6,129,131 A * 10/2000 Colson .................... E06B 9/262 160/171
6,318,439 B1 * 11/2001 Matsubara .............. E06B 9/307 160/115
6,397,918 B1 * 6/2002 Chu ........................ E06B 9/307 160/167 R
6,581,665 B2 * 6/2003 Lin ........................... E06B 9/32 160/115
6,588,480 B2 * 7/2003 Anderson ............... E06B 9/322 160/170
6,622,769 B2 * 9/2003 Judkins ................... E06B 9/322 160/84.05
6,655,441 B2 * 12/2003 Wen ........................ E06B 9/322 160/170
6,766,846 B2 * 7/2004 Song ......................... E06B 9/32 160/168.1 P
6,817,401 B2 * 11/2004 Sun ......................... E06B 9/304 160/176.1 R
6,880,608 B2 * 4/2005 Robinson ................ E06B 9/382 160/178.3
7,287,569 B2 * 10/2007 Lin ......................... E06B 9/303 160/176.1 R
7,367,377 B2 * 5/2008 Lin ......................... E06B 9/322 160/171
7,380,582 B1 * 6/2008 Anderson ................. E06B 9/50 248/267
7,520,311 B2 * 4/2009 Drew ........................ E06B 9/64 160/171
7,540,315 B2 * 6/2009 Chen ....................... E06B 9/322 242/395
7,886,803 B2 * 2/2011 Anderson ................. E06B 9/80 160/170
7,926,540 B2 * 4/2011 Lai .......................... E06B 9/303 160/178.3
8,025,089 B2 * 9/2011 Chelednik ............... E06B 9/322 160/171
8,857,495 B2 * 10/2014 Marocco ................. E06B 9/262 160/89
10,125,541 B2 * 11/2018 Zhang ..................... E06B 9/322
10,415,305 B2 * 9/2019 Huang .................... E06B 9/323
10,837,227 B2 * 11/2020 Huang ...................... E06B 9/34
10,954,716 B2 * 3/2021 Anderson ............... E06B 9/326
10,988,980 B2 * 4/2021 Chou ...................... E06B 9/322
11,255,123 B2 * 2/2022 Slobbe .................... E06B 9/307
11,448,008 B2 * 9/2022 Lei ..................... B65H 75/4492
2004/0261956 A1 * 12/2004 Nien ....................... E06B 9/308 160/176.1 R
2006/0151126 A1 * 7/2006 Lampe .................... E06B 9/262 160/84.01
2008/0093035 A1 * 4/2008 Hsu ........................... E06B 9/32 160/176.1 R
2008/0251624 A1 * 10/2008 Fraczek .................. E06B 9/322 160/170
2008/0262637 A1 * 10/2008 Dorrough ............... E06B 9/322 700/1
2009/0020239 A1 * 1/2009 Yu ........................... E06B 9/322 160/331
2009/0256021 A1 * 10/2009 Dorrough ............... E06B 9/322 242/397
2010/0122779 A1 * 5/2010 Chen ....................... E06B 9/307 160/168.1 V
2011/0061821 A1 * 3/2011 Kim .......................... E06B 9/40 160/291
2012/0073765 A1 * 3/2012 Hontz ..................... E06B 9/304 160/331
2012/0298317 A1 * 11/2012 Huang .................... E06B 9/303 160/170
2013/0098563 A1 * 4/2013 Jang .......................... E06B 9/40 160/120
2013/0248125 A1 * 9/2013 Lin ......................... E06B 9/262 160/331
2014/0020854 A1 * 1/2014 Huang .................... E06B 9/388 160/308
2014/0166218 A1 * 6/2014 Ng ............................ E06B 9/42 160/120
2018/0187480 A1 * 7/2018 Zhang ..................... E06B 9/322
2018/0328108 A1 * 11/2018 Chou ...................... E06B 9/323
2018/0347269 A1 * 12/2018 Wang ......................... E06B 9/30
2019/0063148 A1 * 2/2019 Chiang Huang ....... E06B 9/322
2019/0145162 A1 * 5/2019 Chou ...................... E06B 9/323 160/150
2019/0242186 A1 * 8/2019 Chou ...................... E06B 9/304
2020/0102785 A1 * 4/2020 Hsieh ...................... E06B 9/326

* cited by examiner

WINDOW BLIND LIFTING AND TILTING SYSTEM

CROSS REFERENCE TO RELATED APPLICATIONS

This patent application claims the benefit and priority of Taiwanese Patent Application No. 110206689, filed on Jun. 9, 2021. Taiwanese patent applications No. 110206689 is incorporated herein by reference.

BACKGROUND

Technical Field

The present disclosure generally relates to mechanism for controlling the lifting and the tilting of window blinds.

Description of the Related Arts

A Venetian blind is a type of window blind made from overlapping horizontal slats that are typically lowered and drawn together by pulling a cord. The slats are suspended by cloth tapes or cords which allow them to rotate in unison nearly 180 degrees. Slats can be rotated so that the inner edge faces upward or downward. Between the two extremes, slats can be rotated to varying degrees of separation to allow light to enter the room. Such window blinds can be produced with a lift cord and a tilt cord. Lift cords are threaded through slots in each slat. When pulled, the lift cord moves the bottom of the blind upward causing the slats to press into one another as the blind is raised. Tilt cords are for adjusting the angle of the slats to control the amount of light that gets through.

SUMMARY

Some embodiments provide an apparatus for controlling tilting and lifting operation of a window blind that includes multiple slats and a blind bottom that is positioned below the slats. The apparatus includes a tilting control shaft and a lifting control shaft. A ladder belt is fastened to the tilting control shaft and interconnects the slats, such that rotating the tilting control shaft tilts the slats. Multiple lifting cords are fastened to the lifting control shaft and coupled to the blind bottom, such that rotating the lifting control shaft lifts or lowers the blind bottom and one or more slats in the plurality of slats. In some embodiments, the lifting control shaft has a hallow structure.

In some embodiments, the rotation of the tilting control shaft is controlled by a first bead chain controller and the rotation of the lifting control shaft is controlled by a second bead chain controller. The first and second bead chain controllers are at opposite sides of the window blind. In some embodiments, the tilting control shaft is positioned above the lifting control shaft.

In some embodiments, the ladder belt is one of multiple ladder belts that are fastened to the tilting control shaft and interconnects the plurality of slats. In some embodiments, the ladder belt is populated with loops that allow a lifting cord to thread through to reach the blind bottom. In some embodiments, the ladder belt is a screen having a width that is substantially the same as the window blind and is translucent to permit passage of light.

In some embodiments, two or more reeling drums sleeve the lifting control shaft. Each reeling drum is slidable along the lifting control shaft. Each lifting cords is fastened to a reeling drum. The lifting control shaft has a position groove and each reeling drum comprises a protrusion piece that recess into the position groove, such that rotating the lifting control shaft drives the reeling drums to wind or unwind the lifting cords to retract or release the plurality of slats. In some embodiments, the ladder belt is positioned to align with one of the reeling drums. In some embodiments, the two or more reeling drums include a reeling drum for reeling a spring lift cord that is not coupled to the blind bottom. Pulling the spring lift cord rotates the lifting control shaft to wind a power spring and releases the plurality of slats. Releasing the spring lift cord allows the power spring to unwind and to power the lifting control cord to rotate to retract the slats.

In some embodiments, each reeling drum includes two side guards to confine the winding of the lifting cords to a range at the reeling drum. In some embodiments, two lifting cords are fastened to two opposite ends of each reeling drum. In some embodiments, each reeling drum has an inclined surface to guide the winding of the lifting cords. In some embodiments, stoppers are fastened to the lifting control shaft to limit the movement of the reeling drums, each reeling drums has a conic structure with a wider end and a narrower end. The lifting cords are fastened to the wider ends of the reeling drums and the stoppers are abutting the narrower ends of the reeling drums.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided.

Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

A typical window blind such as a Venetian blind has a U-shaped track as its main body. Within the cavity of the U-shaped track houses various mechanisms for controlling the lifting and the tilting of the slats. The mechanisms for controlling lifting and tilting slats have many components. These components take a long time to assemble, which in turn greatly increase the production costs of the blinds. In addition, the blind bottom of the Venetian blind is often unstable. This is because the cords or strings used for lifting and tilting blinds typically goes around a roller and then extends downward and is fixed at two or more different positions on the blind bottom. The lengths of the strings for the two positions are different, and the corresponding tensile forces on the strings are also different. The difference in tensile forces causes the slats of the blind to be unbalanced and unstable, particularly when the blind bottom is being lifted by the strings.

Some embodiments of the invention provide a window blind design that allows smooth, balanced lifting of the slats. The window blind design lowers production cost by having fewer and simpler components. The design includes two control shafts for lifting and tiling slats: a tilting control shaft and a lifting control shaft. Ladder belts for controlling the tilting of the slats are affixed to the tilting control shaft. The lifting cords for lifting the slats and the blind bottom are winded on the lifting control shaft, and the lifting control shaft can rotate to reel in the lifting cord to lift the blind bottom. In some embodiments, the lifting control shaft is sleeved with two or more reeling drums (also called winding cord spools) for guiding the winding or reeling of the lifting cords. In some embodiments, each reeling drum has a tapered or inclined structure (cone or conic shaped) to guide the cord reeling and may slide horizontally as the cord winds or unwinds. The lifting cords are fixed to opposite ends of the reeling drums and are positioned to apply symmetrical tension to the reeling drums so that the blind bottom and the slats may be lifted and lowered in a balanced, stable manner. Furthermore, the cords of the window blind design are confined to the control shafts and the slats. No control strings are exposed to the user, thereby minimizing choking hazards to children.

Figure 1:
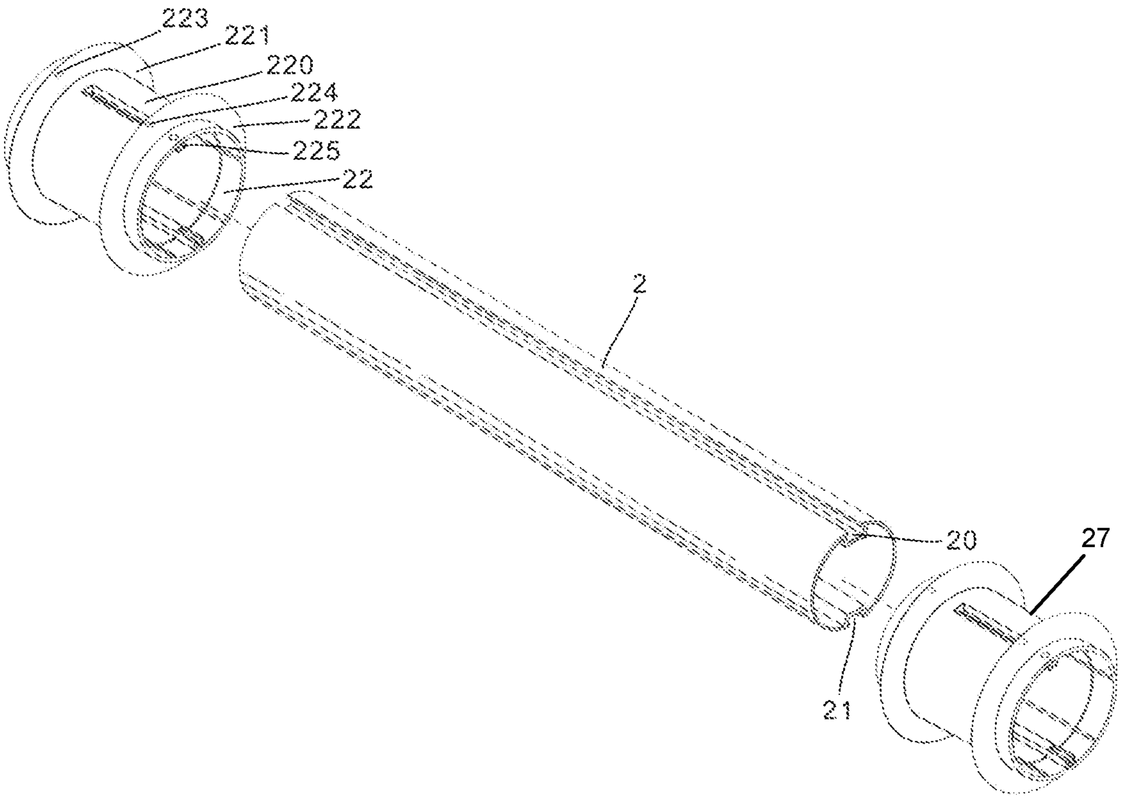
FIG. 1 shows a lifting control shaft and reeling drums in an exploded view.
Figure 2:
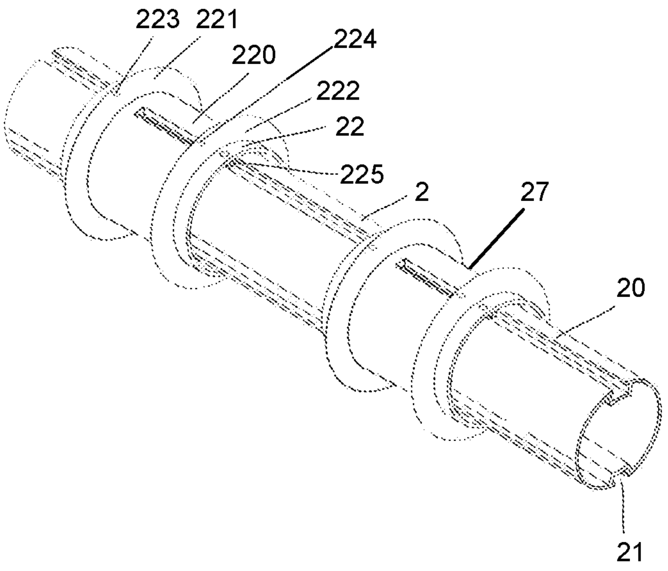
FIG. 2 shows the lifting control shaft with the reeling drums installed.

FIG. 1 shows a lifting control shaft 2 and reeling drums 22 and 27 in an exploded view. FIG. 2 shows the lifting control shaft 2 with the reeling drums 22 and 27 installed. The lifting control shaft 2 has a hallow cylindrical body, and its cross-sectional structure may be shaped as an arch, a fan, a semicircle, an arc, a circle, a triangle, a quadrangle, a pentagon, a hexagon, or any other two-dimensional shapes. The reeling drums 22 and 27 can slide along the lifting control shaft 2. Positioning grooves 20 and 21 run longitudally along opposite sides of the cylindrical body of the lifting control shaft 2. The inner surface of the reeling drum 22 has a protrusion piece 225 for mating with the positioning groove 20 or 21 of the lifting control shaft 2, such that when the lifting control shaft 2 rotates, the protrusion piece 225 drives the reeling drum 22 (and the reeling drum 27) to also rotate. The reeling drum 22 has side guards 221 and 222 at its two ends. The two side guards 221 and 222 define the range of the cord or string being reeled in by the reeling drum 22. The head or end of the cord is fixed to the reeling drum 22 through holes 223 and 224. The body of the reeling drums 22 and 27 may be cone-shaped with an inclined or tapered surface.

Figure 3:
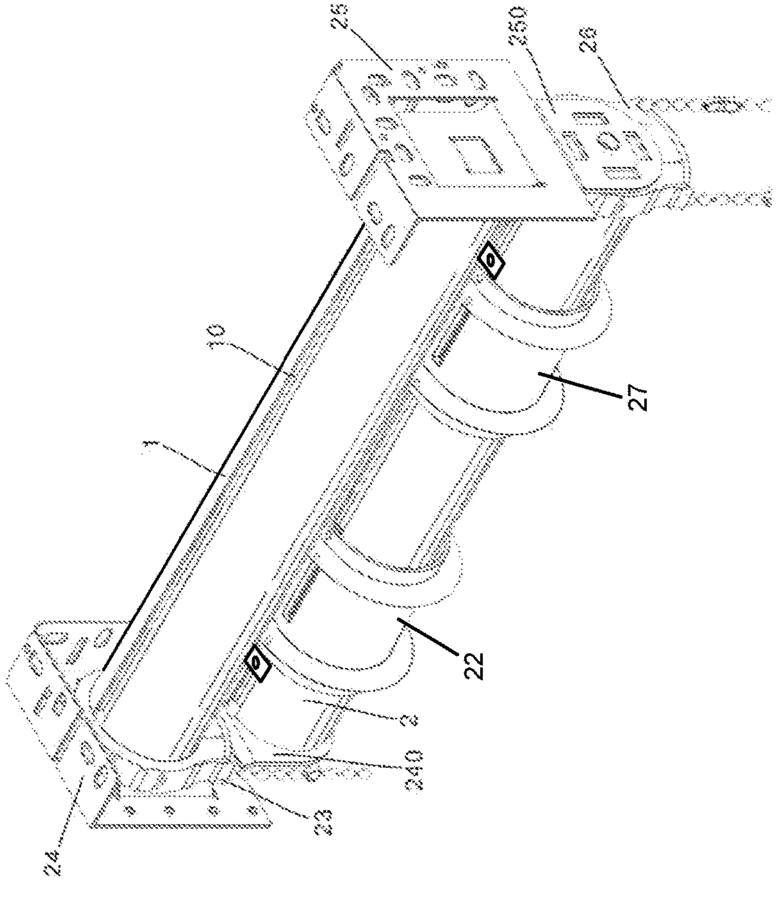
FIG. 3 shows an assembly of tilting and lifting control shafts.

FIG. 3 shows an assembly of tilting and lifting control shafts. The tilting control shaft 1 has a hallow cylindrical body, and its cross-sectional structure may be shaped as an arch, a fan, a semicircle, an arc, a circle, a triangle, a quadrangle, a pentagon, a hexagon, or any other two-dimensional shapes. The upper and lower ends of the hallow cylindrical body are provided with positioning grooves 10. The lifting control shaft 2 also has a hollow structure, and is sleeved with reeling drums 22 and 27.

A first bead chain controller 23 (tilting bead chain controller) is attached to an opening at a first side end of the tilting control shaft 1 that is assembled to a first fixed frame 24. A second side end of the tilting control shaft 1 is sleeved with a joint seat (not shown in the figure), which is used to fix the second side end of the tilting control shaft 1 to a second fixed frame 25. Thus, the tilting control shaft 1 is installed between the first fixed frame 24 and the second fixed frame 25.

A second bead chain controller 26 (lifting bead chain controller) is attached to an opening of a first side end of the lifting control shaft 2 that is assembled to the second fixed frame 25. The second bead chain controller 26 fixes one end of the lifting control shaft 2 on a first extension frame 250 at the lower end of the second fixing frame 25. A second side end of the lifting control shaft 2 is sleeved with a connecting seat (not illustrated) for connecting the lifting control shaft 2 to a second extension frame 240 at the lower end of the first fixing frame 24. Thus, the lifting control shaft 2 is installed between the first extension frame 250 and the second extension frame 240. In an embodiment illustrated by the example of FIG. 3, the lifting control shaft 2 is located beneath the tilting control shaft 1.

Figure 4:
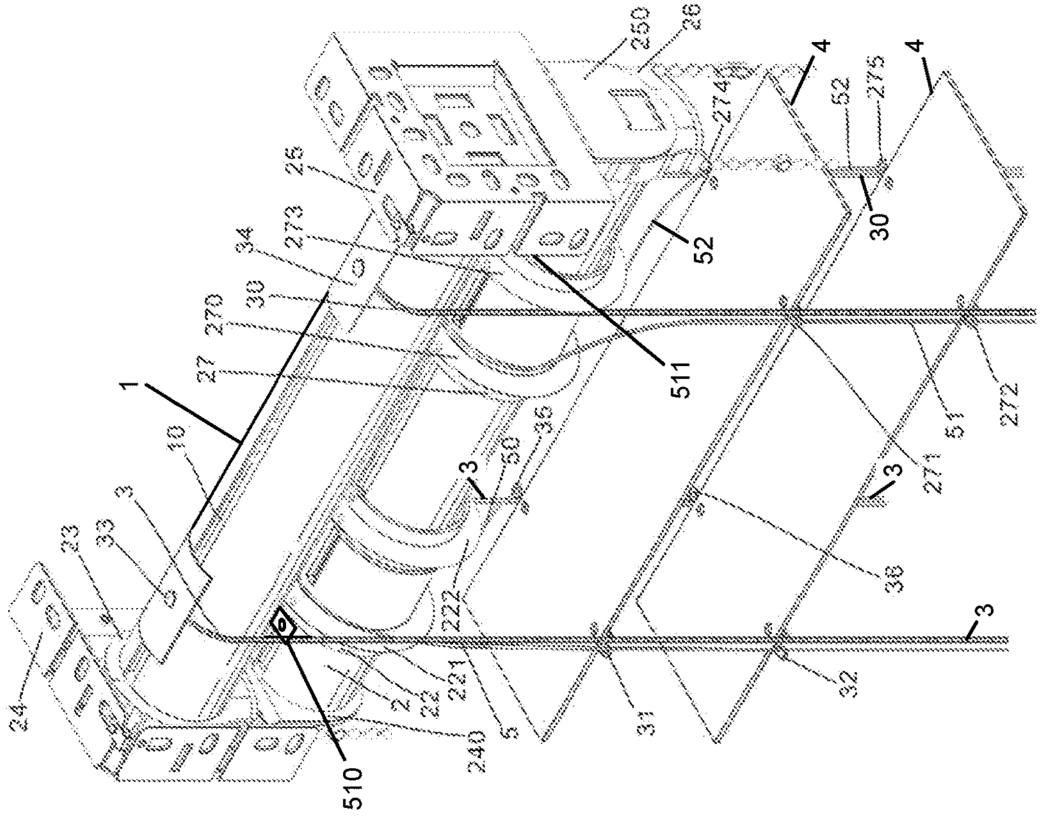
FIG. 4 shows a window blind that incorporates the assembly of the tilting and lifting control shafts for lifting and tilting the slats of the blind.
Figure 5:
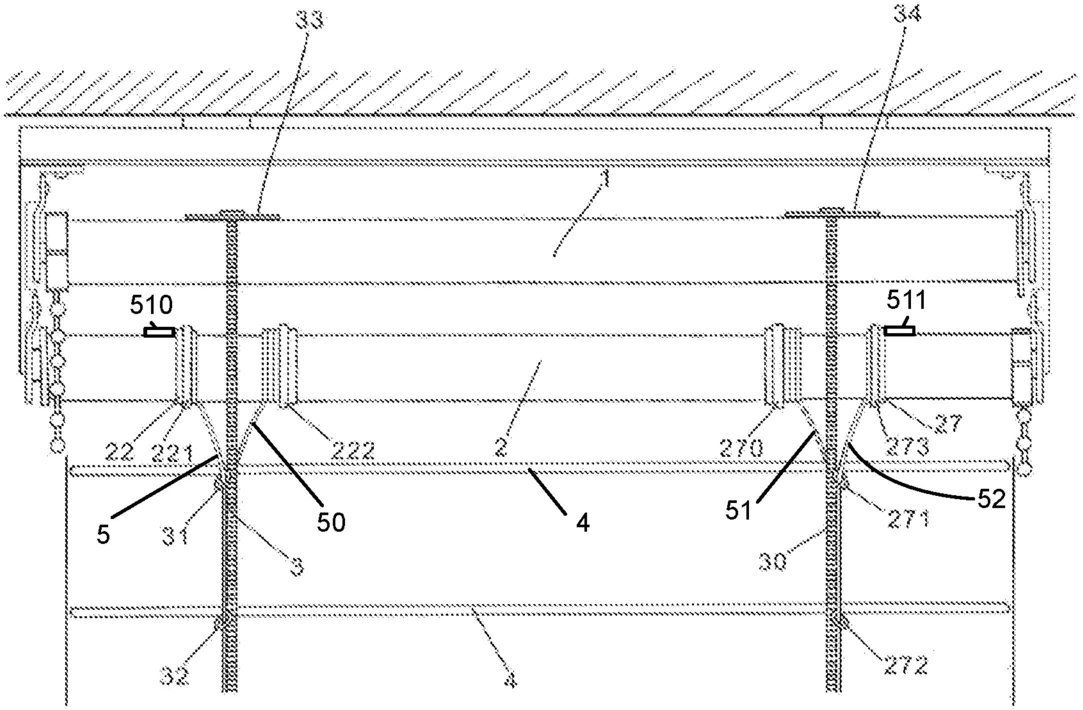
FIG. 5 is a corresponding front elevation view of the window blind that incorporates the assembly of the tilting and lifting control shafts.

FIG. 4 shows a window blind that incorporates the assembly of the tilting and lifting control shafts for lifting and tilting the slats of the blind. FIG. 5 is a corresponding front elevation view of the window blind that incorporates the assembly of the tilting and lifting control shafts. The number of lifting cords, ladder belts, and reeling drums may vary based on the size (width) of the window blind. The example of FIG. 4 illustrates a relatively small window blind that requires only two ladder belts 3 and 30, two reeling drums 22 and 27, and two sets of lifting cords (lifting cords 5 and 50 is a first set at the left and lifting cords 51 and 52 is a second set at the right). The slats 4 can be strips of rigid material (e.g., wood, plastic, thin metal) that strung together by the ladder belts and the lifting cords. The slats can also be strips of flexible material (cloth or other types of fabric).

As illustrated in FIGS. 4 and 5, the tilting control shaft 1 is used to control the tilting of slats 4. The tilting control shaft 1 is assembled with a ladder belt set, and the ladder belt drives the tilting control shaft 1 to rotate. The ladder belt set includes two ladder belts 3 and 30. The ladder belt 3 is populated with equidistant loops (e.g., loops 31 and 32) and the ladder 30 is populated with equidistant loops (e.g., loops 271 and 272). In some embodiments, the loops of the ladder belts are located at edges of the slats. The ladder belts 3 and 30 are disposed across the positioning groove 10 at the top cylindrical surface of the tilting control shaft 1, and fixing pieces 33 and 34 affix the ladder belts 3 and 30 respectively to the tilting control shaft 1 at the positioning groove 10. The affixed ladder belts 3 and 30 are positioned so they are hung to be near or at the middle of the reeling drums 22 and 27, respectively. The two ladder belts 3 and 30 are hung down from both sides of the tilting control shaft 1. Each ladder belt is connected to each of the slats 4 for controlling the tilting (opening and closing) of the slats. Stoppers 510 and 511 are installed at the lifting control shaft 2 to limit the movement of the reeling drums 22 and 27. This causes the lifting cords to wrap around the reeling drums 22 and 27 in a stable manner.

The lifting control shaft 2 is assembled with a lifting cord set, which includes a first lifting cord 5, a second lifting cord 50, a third lifting cord 51, and a fourth lifting cord 52. Each lifting cord of the lifting cord set is wound around the lifting control shaft 2, specifically at reeling drum 22 or 27. Each lifting cord is fastened to a reeling drum and threaded through the equidistant loops of the ladder belts to connect to the blind bottom. Specifically, the first lifting cord 5 and the second lifting cord 50 are wound by the reeling drum 22 and positioned over the left side of the slats 4. The first lifting cord 5 is fastened to a left side guard 221 of the reeling drum 22, and threaded through the loops 31 and 32 of the ladder belt 3 to connect to the blind bottom 6 (shown in FIGS. 6-7). The second lifting cord 50 is fastened to a right side guard 222 of the reeling drum 22 and threaded through the loops 35 and 36 of the ladder belt 3 to connect to the blind bottom 6. Both the first and second lifting cords 5 and 50 are wound around the reeling drum 22 in the same counterclockwise direction. Similarly, the third lifting cord 51 and the second lifting cord 52 are wound by the reeling drum 27 and positioned over the right side of the slats 4. The third lifting cord 51 is fastened to a left side guard 270 of the reeling drum 27 and threaded through the loops 271 and 272 of the ladder belt 30 to connect to the blind bottom 6. The fourth lifting cord 52 is fastened to a right side guard 273 of the reeling drum 27 and threaded through the loops 274 and 275 of the ladder belt 30 to connect to the blind bottom 6. Both the third and fourth lifting cords 51 and 52 are wound around the reeling drum 27 in the same counterclockwise direction.

Figure 6A:
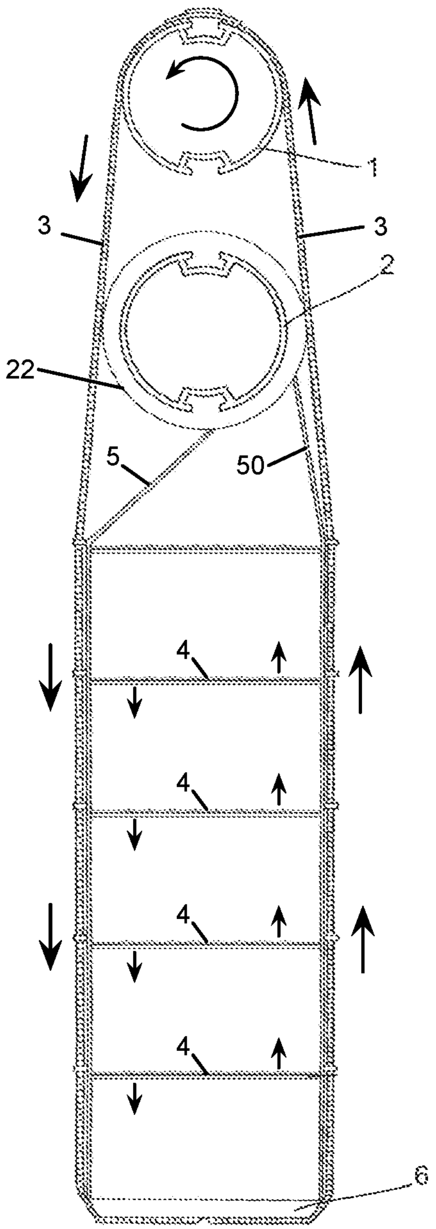
FIGS. 6A-B show the tilting of the window blind by the tilting control shaft.
Figure 6B:
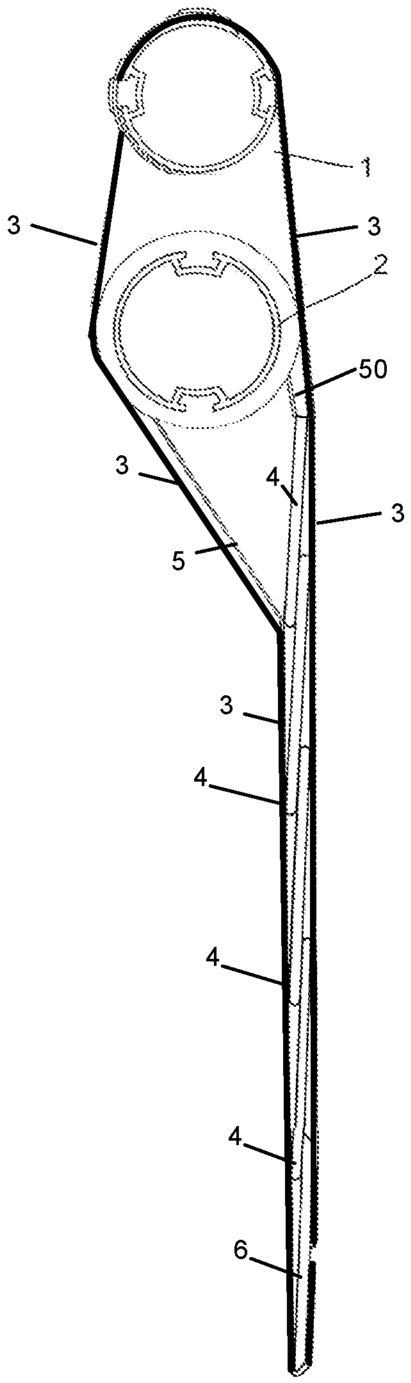

FIGS. 6A-B show the tilting of the window blind by the tilting control shaft. FIG. 6A shows the window bind with slats in fully open position. FIG. 6B shows the window blind with slats in fully closed position. To tilt the slats 4, the first bead chain controller 23 can be pulled to rotate the tilting control shaft 1. The front portions of the ladder belts 3 and 30 would then move up or down relative to the rear portion of the ladder belts. Since the slats 4 are interconnected by the ladder belts 3 and 30, the relative movements of the ladder belts would cause the interconnected slats to tilt accordingly. FIGS. 6A-B also show that rotating the tilting control shaft 1 (by e.g., pulling on the bead chain controller 23) causes the front portion of the ladder belt 3 to move relative to the rear potion of the ladder belt 3, thereby tilting the slats that are interconnected by the ladder belt.

Figure 7A:
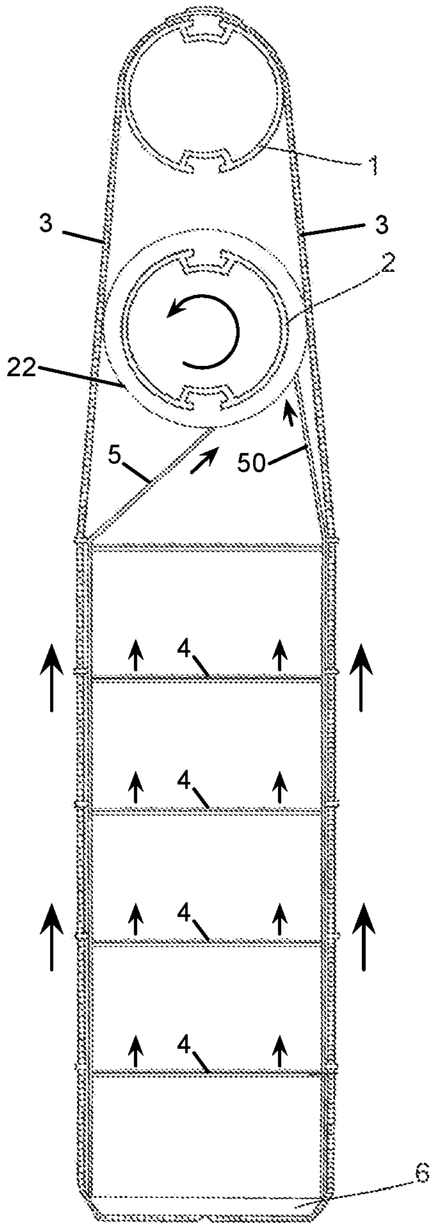
FIGS. 7A-B show the lifting of the window blind by the lifting control shaft.
Figure 7B:
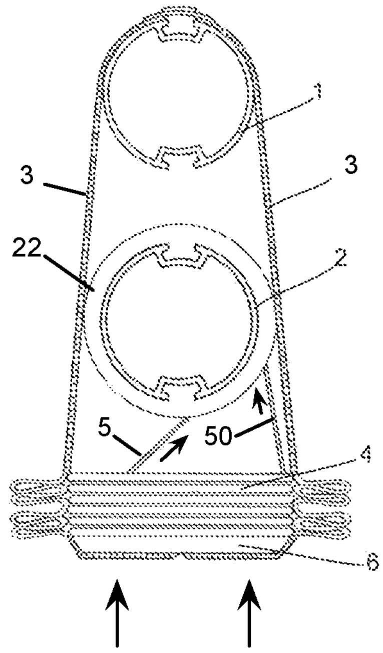

FIGS. 7A-B show the lifting of the window blind by the lifting control shaft. FIG. 7A shows the window blind with slats in a fully released position. FIG. 7B shows the window blind with slats in a fully retracted position. To lift the blind bottom 6 and retract the slats 4, the second bead chain controller 26 is pulled to rotate the lifting control shaft 2, which drives the reeling drum 22 and the reeling drum 27 to also rotate. The rotation of the reeling drums causes the lifting cords 5 and 50 to wind around the reeling drums 22 in a range constrained by the side guards 221 and 222, and the lifting cords 51 and 52 to wind around the reeling drums 27 in a range constrained by the side guards 270 and 273. Since each reeling drum is fastened to by a pair of lifting cords at the opposite ends (the two side guards) of the reeling drum, the two lifting cords in the pair applies opposite lateral tension to the reeling drum due to the weight of the blind bottom. The reeling drum would slide along the lifting control shaft until the lateral tensile forces from the two lifting cords are in balance. For example, for the reeling drum 22, the lifting cord 5 is fastened to the side guard 221 and applies a tensile force to the right and the lifting cord 50 is fastened to the side guard 222 and applies a tensile force to the left. The reeling drum 22 would slide along the lifting control shaft 2 until the two tensile forces are the same.

Still further, since the lifting cords are symmetrically positioned at the lifting control shaft 2, the two reeling drums 22 and 27 experience similar torque and are in a balanced state. This allows the ladder belts 3 and 30 to remain at or near the corresponding middle positions of the reeling drums 22 and 27. The ladder belts would remain stable as lifting cords are reeled in to lift the blind bottom 6 and retract the slats 4 and the ladder belts 3 and 30. FIG. 7 shows that rotating the lifting control shaft 2 (by e.g., pulling on the bead chain controller 26) reels in the lifting cords 5 and 50 and thereby lifting the blind bottom 6 and one or more of the slats 4.

Figure 8:
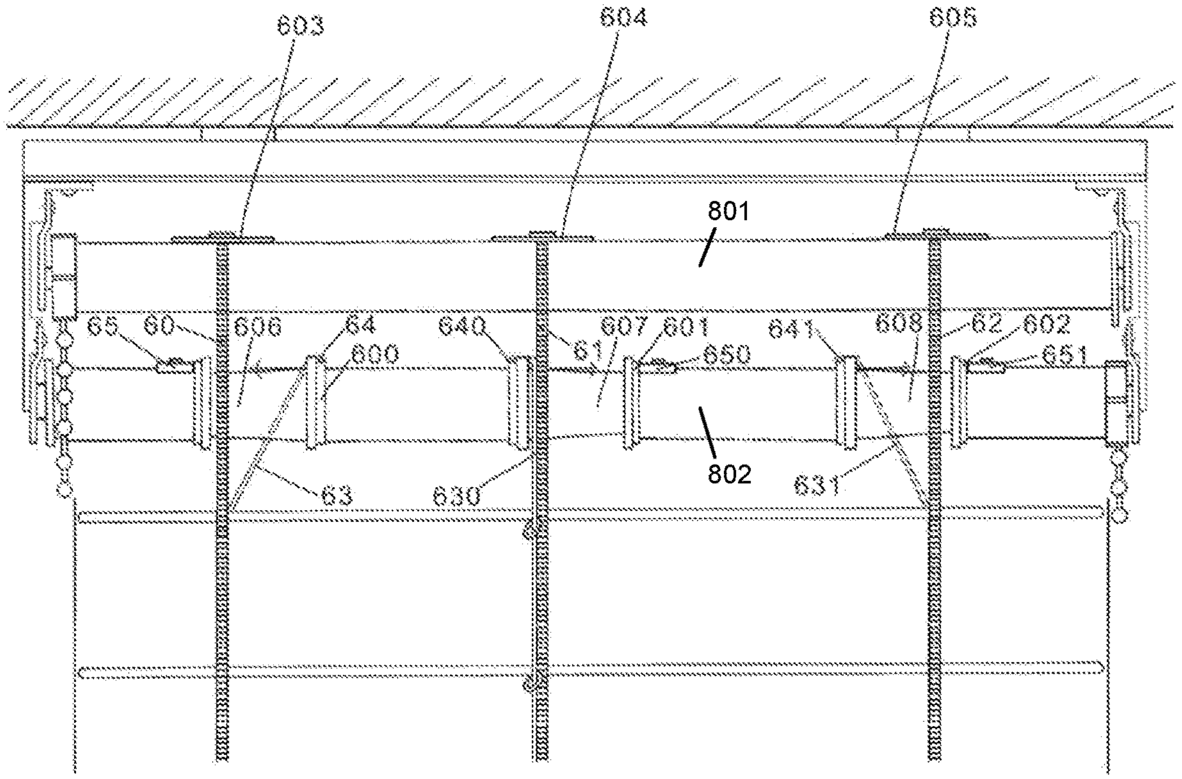
FIG. 8 shows a larger window blind that uses three sets of lifting cords.

FIG. 8 shows a larger window blind that uses three sets of lifting cords. The window blind of FIG. 8 has a tilting control shaft 801 and a lifting control shaft 802. Three ladder belts 60, 61, 62 are hung from the tilting control shaft 801 for tilting the slats of the blind, while three reeling drums 600, 601, and 602 sleeve the lifting control shaft 802 for reeling lifting cords 63, 630, and 631 of the blind. The ladder belts 60, 61, and 62 are fixed to the tilting control shaft 801 by fixing pieces 603, 604, and 605 respectively.

As mentioned, in some embodiments, the cylindrical bodies of the reeling drums (e.g., 22 and 27) have inclined cone structures for guiding lifting cords. The cylindrical bodies of the reeling drums 600, 601, and 602 (606, 607, and 608 respectively) all have inclined cone structures. Lifting cords 63, 630 and 631 are installed by fixing their head ends (64, 640, and 641 respectively) to larger ends of the cone structures of the cylindrical bodies 606, 607, and 608. Stoppers 65, 650, and 651 are positioned adjacent to the smaller ends of the cylindrical bodies 606, 607, and 608 so that the reeling drums 600, 601, and 602 can only slide toward the head ends 64, 640, and 641 of the lifting cords. When reeling in the lifting cords to pull up the slats of the blind, the middle lifting cord 630 is guided by the cone structure to wind around the reeling drum 601. The tension on the left lifting cord 63 causes the left reeling drums 600 to slide left, and the tension on the right lifting cord 631 causes the right reeling drum 602 to slide right. However, the presence of the stoppers 65, 650, and 651 limits the movement of the reeling drums. This causes the lifting cords to wrap around the cone structures of the reeling drums in a stable manner. Furthermore, the lifting cords 63 and 631 applies opposite corresponding lateral forces to the left reeling drum 600 and the right reeling drum 602, resulting in balanced and stable slat lifting/lowering operations.

Figure 9:
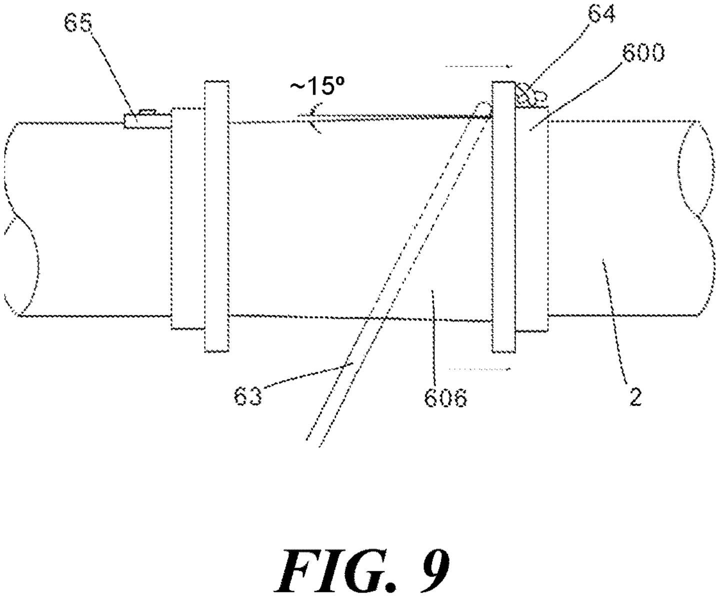
FIG. 9 illustrates the cylindrical body of the reeling drum in a cone structure.

FIG. 9 illustrates the cylindrical body 606 of the reeling drum 600. As illustrated, the cylindrical body 606 of the reeling drum 600 has a cone structure with an inclined surface. In some embodiments, the inclined surface is around 15 degrees from horizontal (e.g., between 10° and 20°) The lifting cord 63 has a head end 64 that is tied to the (right) side guard at the larger end of the cone structure. At the other, smaller end of the cone structure, the stopper 65 is present to abut the reeling drum 600 so the reeling drum cannot slide left past it.

Figure 10:
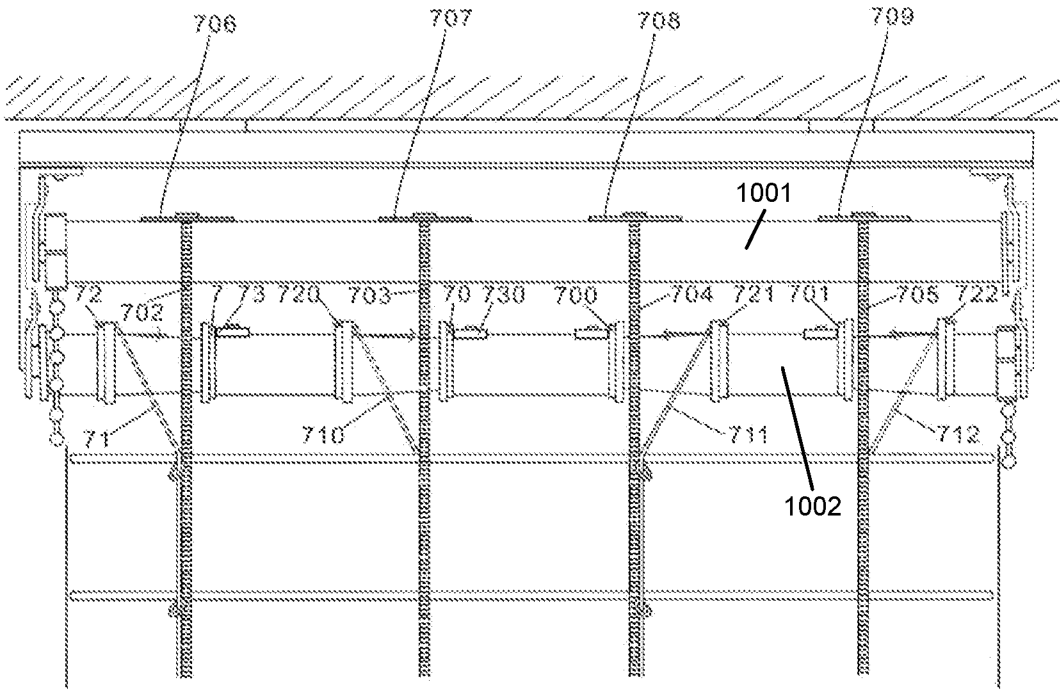
FIG. 10 shows an even larger window blind that uses four sets of lifting cords.

FIG. 10 shows an even larger window blind that uses four sets of lifting cords. The window blind of FIG. 10 has a tilting control shaft 1001 and a lifting control shaft 1002. Four ladder belts 702, 703, 704, and 705 are hung from the tilting control shaft 1001 for tilting the slats of the blind, while four reeling drums 7, 70, 700, and 701 sleeve the lifting control shaft 1002 for reeling the lifting cords 71, 710, 711, and 712 of the blind. The ladder belts 702, 703, 704, and 705 are fixed to the tilting control shaft 1001 by fixing pieces 706, 707, 708, and 709 respectively. The cylindrical bodies of the reeling drums 7, 70, 700, and 701 all have inclined cone structures. The reeling drums 7 and 70 at the left side of the lifting control shaft 1002 have an opposite orientation as the reeling drums 700 and 701 at the right side of the lifting control shaft 1002.

Lifting cords 71, 710, 711, 712 are installed by fixing their head ends (72, 720, 721, and 722) respectively to larger ends of the cone structures of the reeling drums 7, 70, 700, and 701. Stoppers 73, 730, 731, and 732 are positioned such that the reeling drums 7, 70, 700, and 701 can only slide toward the head ends (72, 720, 721, and 722) of the lifting cords. Thus, when reeling in the lifting cords 71, 710, 711, 712 to pull up the slats of the blind, the four lifting cords are guided by the cone structures of the reeling drums 7, 70, 700, and 701 to wind around the reeling drums.

The tension on the lifting cords causes the reeling drums 7 and 70 to slide in opposite direction as the reeling drums 700 and 701. Specifically, the tension on the lifting cords 71 and 710 causes the reeling drums 7 and 70 to slide right, and the tension on the lifting cord 711 and 712 causes the reeling drums 700 and 701 to slide left. However, the presence of the stoppers 73, 730, 731, and 732 limit the movement of the reeling drums 7, 70, 700, and 701. This causes the lifting cords to wrap around the cone structures of the reeling drums. Since the lifting cords 71 and 710 applies opposite lateral forces from the left as the lifting cords 711 and 712 from the right, the reeling of different lifting cords will be balanced. This results in slat lifting/lowering operations that are more stable.

In some embodiments, the slats are strips of flexible material (e.g., fabric, cloth) and may be constructed from the same material as the ladder screen. In some embodiments, the flexible slats are woven between the front and rear portions of ladder screen and may be supported by rigid inserts. In some of these embodiments, the fabric of the flexible slats have holes for the lifting cords 5, 50, 51, and 52 to go through to reach the blind bottom 6.

Figure 11:
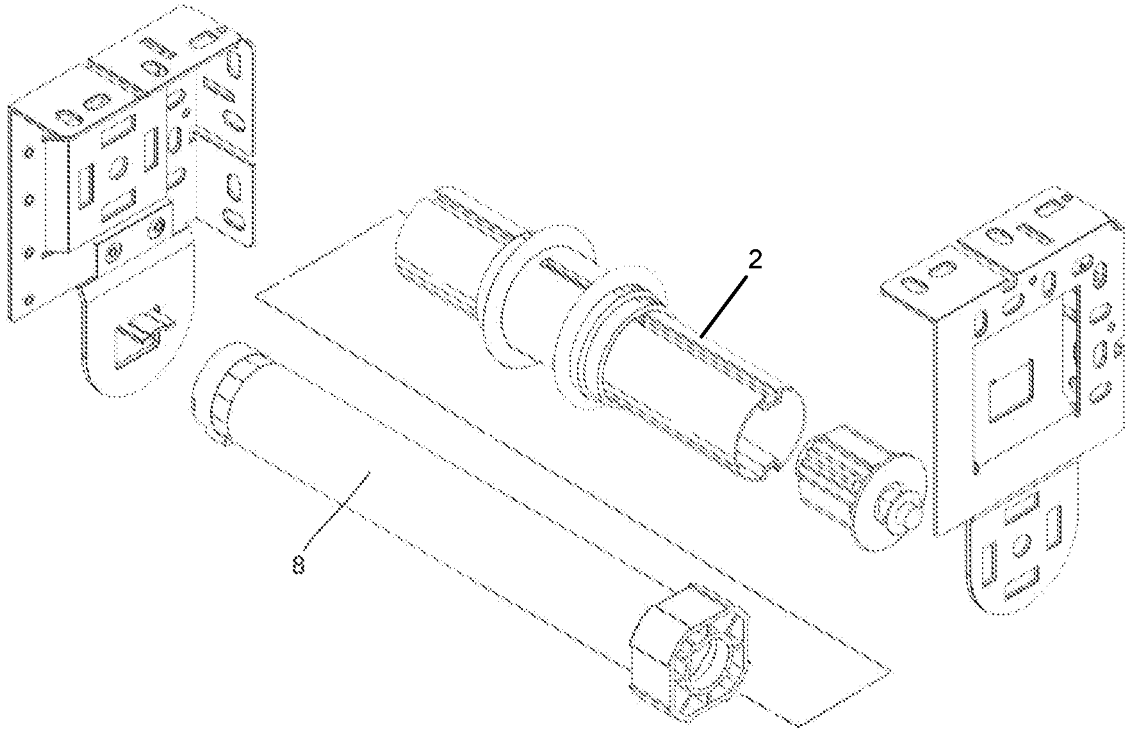
FIGS. 11-13 show the lifting control shaft in an assembly for an electric powered blind.
Figure 12:
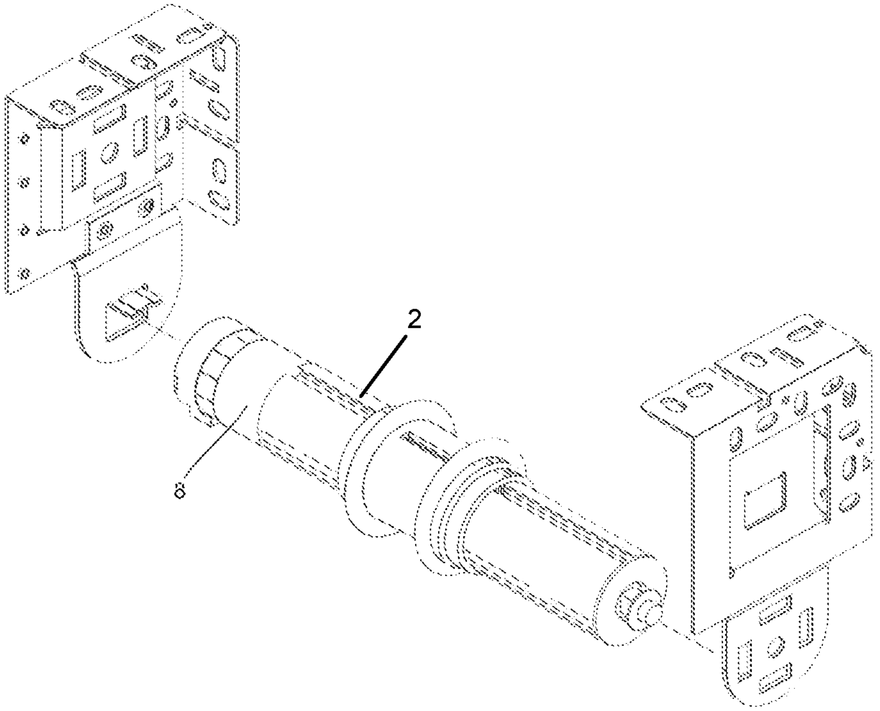
Figure 13:
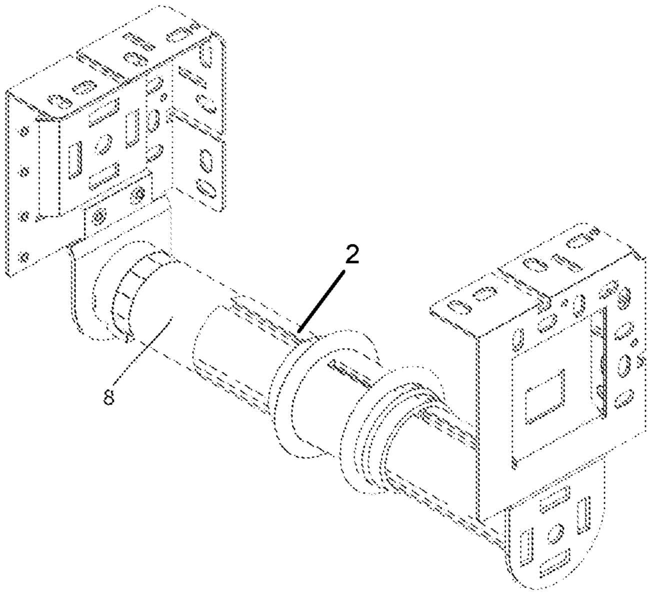

In some embodiments, the lifting control shaft 2 is used in an electric powered window blind, in which the operations of the lifting control shaft 2 is powered by an electric motor. FIGS. 11-13 show the lifting control shaft in an assembly for an electric powered blind. Specifically, an electric motor in a driving rod 8 is installed within the lifting control shaft 2. The driving rod 8 powers the rotation of the lifting control shaft 2 so the retraction and the release of the blind slats are powered by the electric motor.

Figure 14:
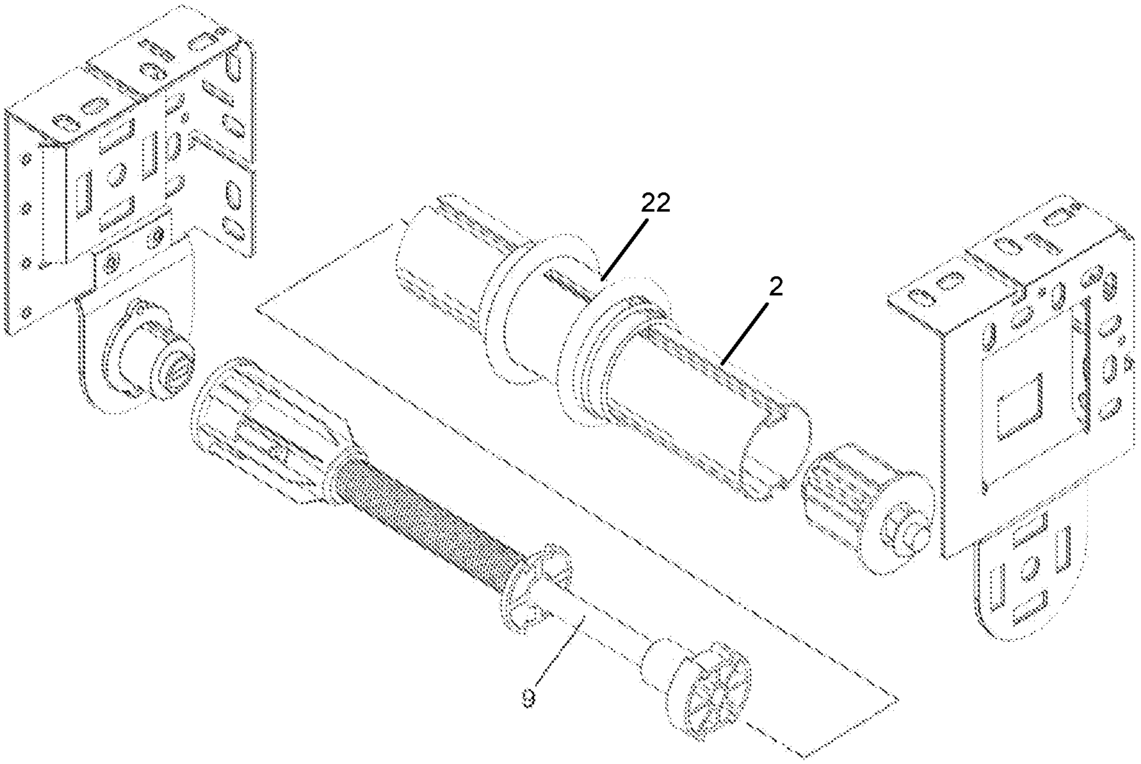
FIGS. 14-15 show the lifting control shaft in an assembly for a cordless blind.
Figure 15:
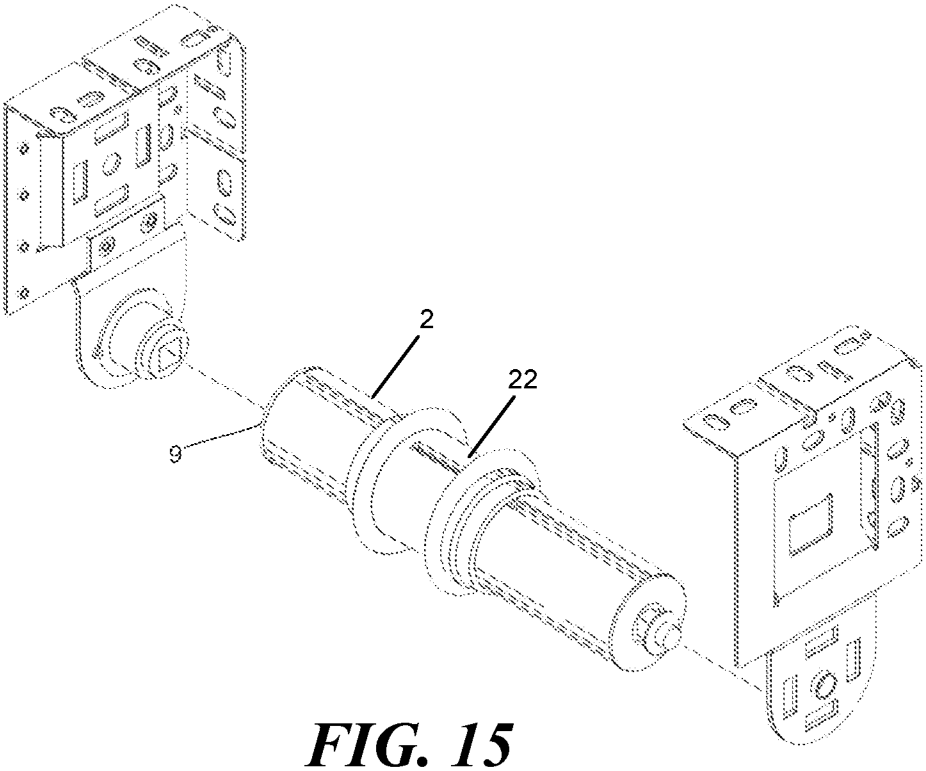

FIGS. 14-15 show the lifting control shaft in an assembly for a cordless blind. As illustrated, a driving rod 9 is assembled with the lifting control shaft. The elastic force of the driving rod 9 is used to drive the lifting control shaft 2 to rotate to fold or open the blind.

Figure 16:
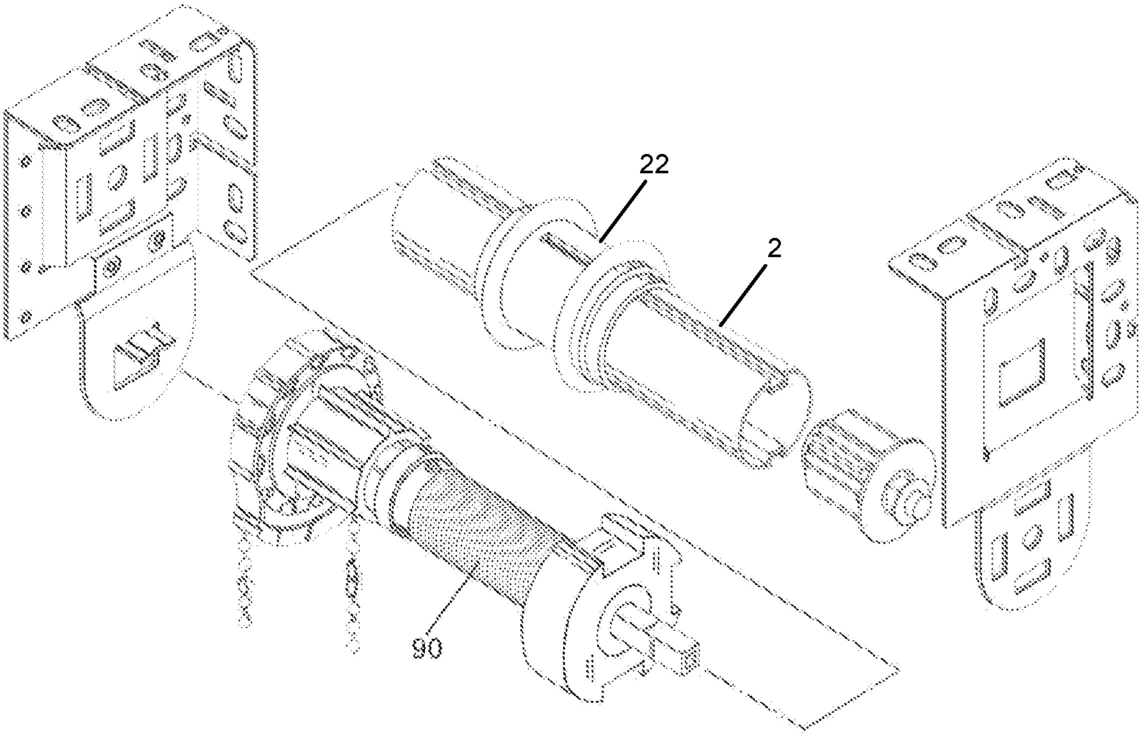
FIG. 16 shows the lifting control shaft being powered by a spring.

In some embodiments, the lifting control shaft 2 is used in a spring-assisted window blind, in which the operations of the lifting control shaft 2 is powered by a spring. FIG. 16 shows the lifting control shaft being powered by a spring. Specifically, a spring controller 90 is assembled with the lifting control shaft 2. The spring controller 90 can wind and unwind to propel the rotation of the lifting control shaft 2.

Figure 17:
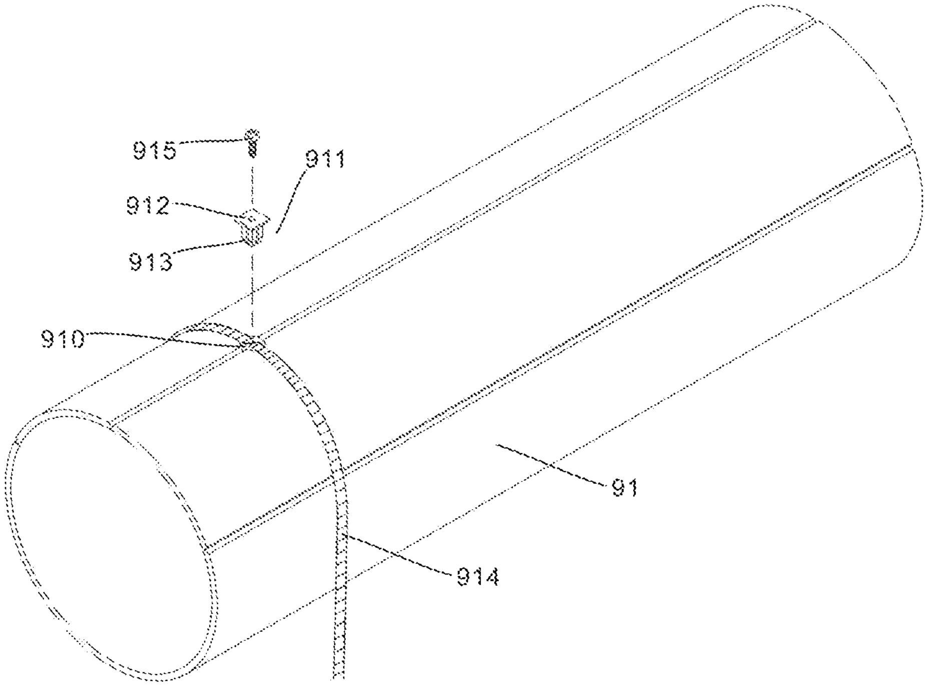
FIGS. 17-18 show the tilting control shaft in some embodiments.
Figure 18:
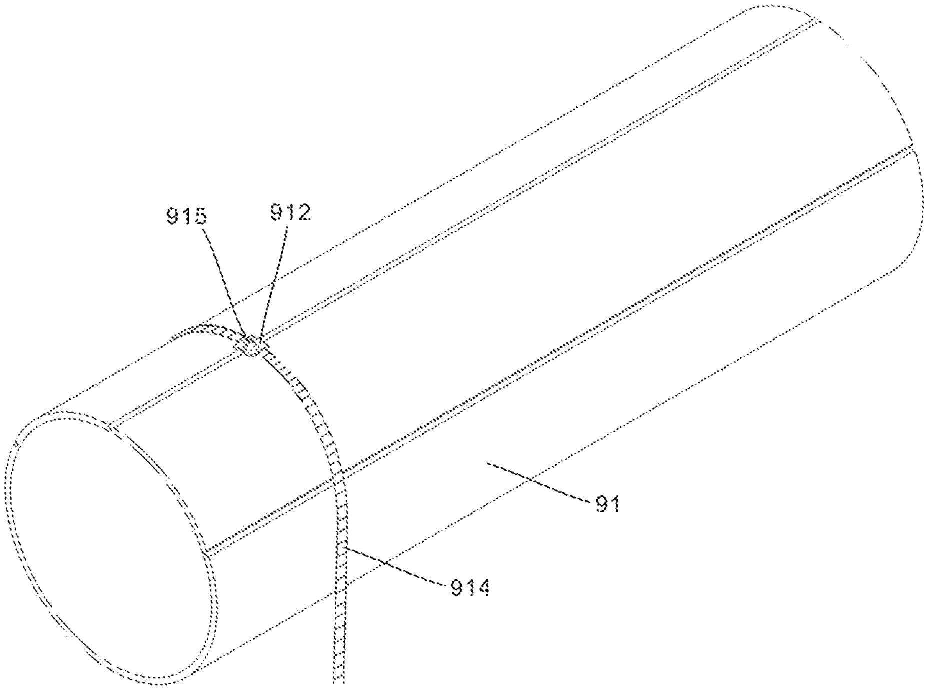

FIGS. 17-18 show the tilting control shaft in some embodiments. A tilting control shaft 91 has a through hole 910 that is formed on the body of the tilting control shaft. The through hole 910 can be plugged by a corresponding matching a plug 911. The plug 911 has a plug cap 912 and a plug post 913 that protrudes downward. After a ladder belt 914 is placed over the through hole 910, the plug post 913 of the plug 911 is plugged into the through hole 910. The plug cap 912 caps the ladder belt 914. The plug 912 and the ladder belt 910 are fastened to the tilting control shaft 91 by a screw 915, so that the ladder belt 914 is controlled by the tilting control shaft 91 for tilting slats of the blind.

Figure 19:
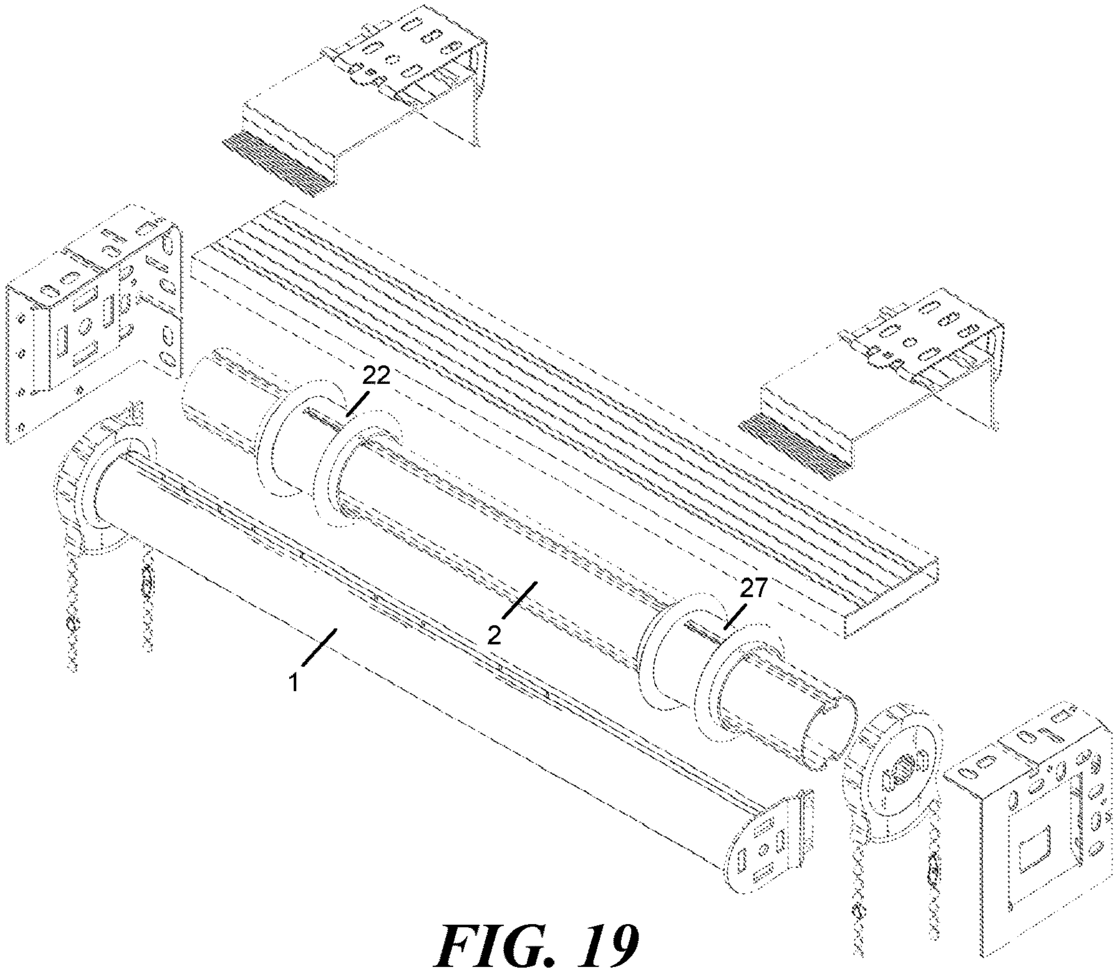
FIGS. 19-20 illustrate an assembly of tilting and lifting control shafts for a window blind in which the tilting control shaft is positioned to the side of the lifting control shaft.
Figure 20:
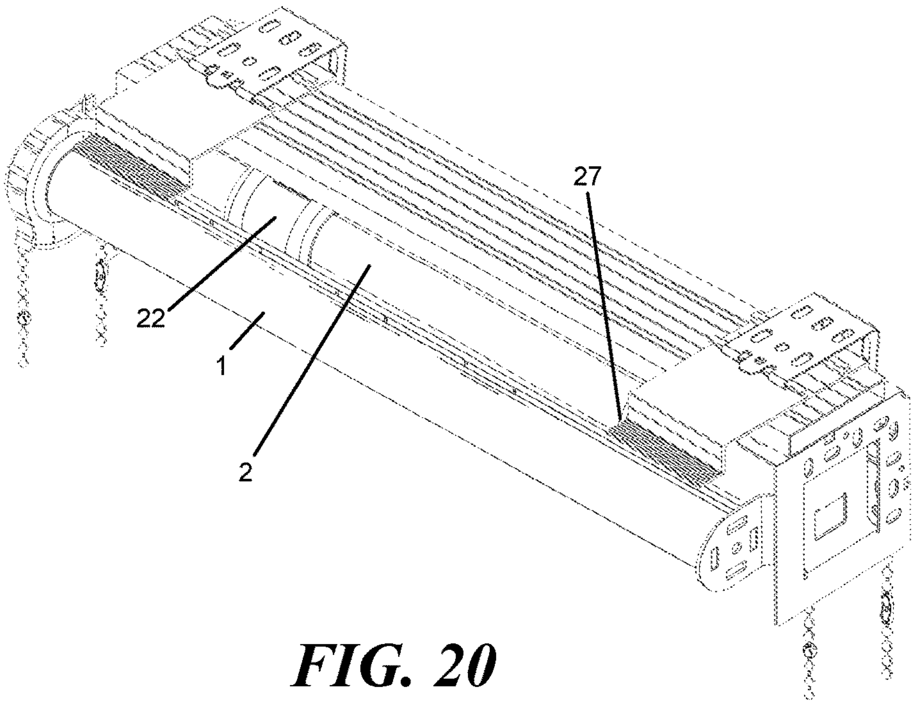

In the example of FIGS. 3-4, the assembly of the tilting and lifting control shafts have the tilting control shaft 1 positioned directly above the lifting control shaft 2. In some embodiments, the tilting control shaft 1 may be positioned differently relative to the lifting control shaft 2. For example, in some embodiments, the tilting control shaft 1 is positioned to the side of the lifting control shaft 2. FIGS. 19-20 illustrate an assembly of tilting and lifting control shafts for a window blind in which the tilting control shaft 1 is positioned to the side of the lifting control shaft 2.

In the example of FIGS. 4, 5, 8, 10, and 17-18, the tilting control shaft (e.g., 1) is used to support and control multiple ladder belts (e.g., 3 and 30) for tilting the slats, and each ladder belt is in the form of a string, a cord, or a thin strip that interconnects the slats (e.g., 4) and the blind bottom (e.g., 6) of the window blind. In some embodiments, instead of the multiple ladder belts, a one-piece ladder screen that is nearly the width of the window blind is used for tilting of the slats.

Figure 21:
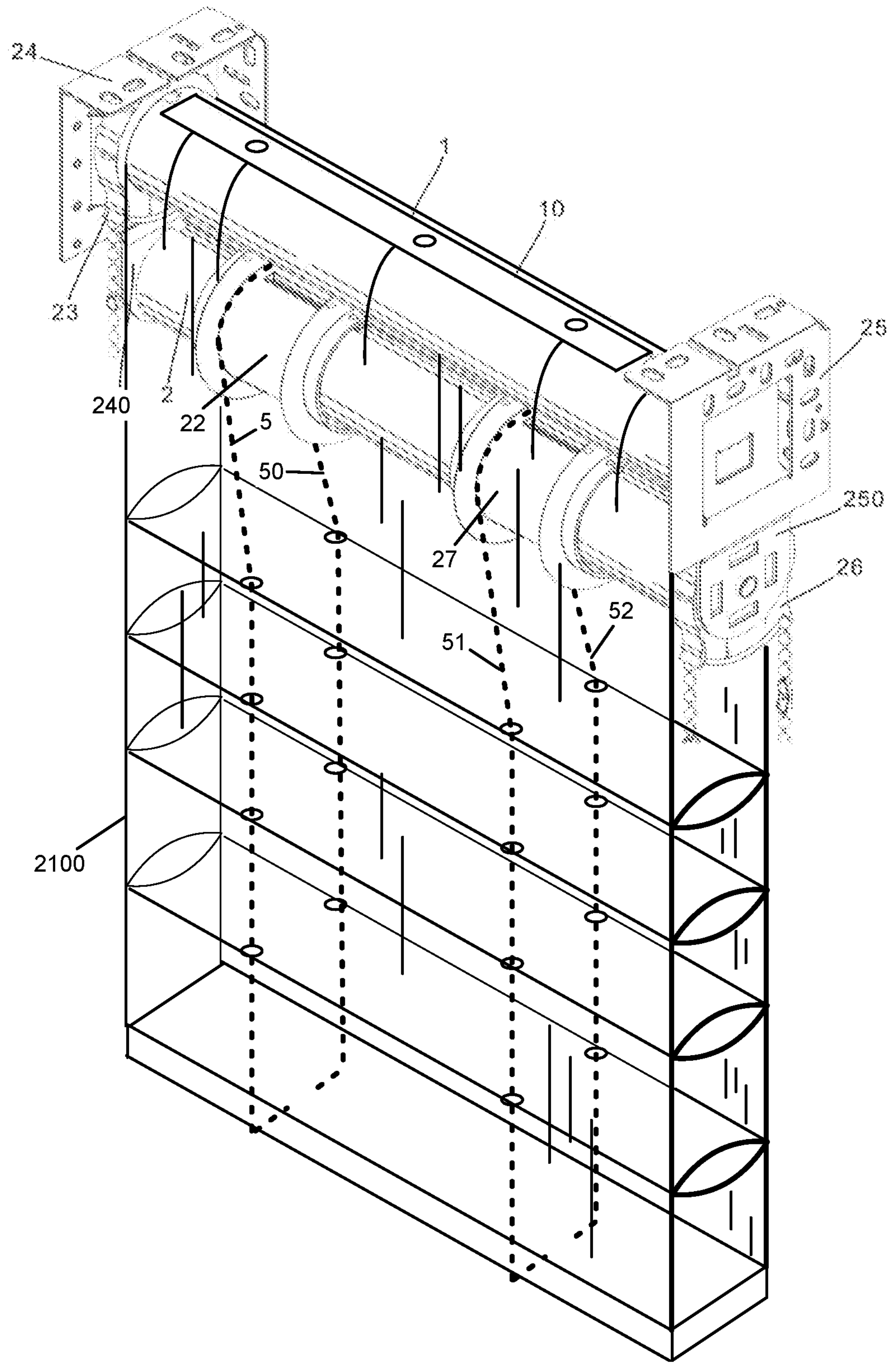
FIG. 21 illustrates a window blind that uses a ladder screen for tilting slats.

FIG. 21 illustrates a window blind that uses a ladder screen for tilting slats. As illustrated, an assembly of the tilting control shaft 1 and the lifting control shaft 2 is used to control the tilting and lifting of the slats 4 of the window blind. The head ends of lifting cords 5, 50, 51, and 52 are fixed to the lifting control shaft 2 so the cords can be reeled-in to lift the blind bottom 6. A ladder screen 2100 that spans the width of the window blind is used to control tilting. The ladder screen 2100 is translucent or transparent so light can go through. The ladder screen 2100 is fixed to the tilting control shaft 1 and interconnects the slats 4 at the front and the rear. The rotation of the tilting control shaft 1 causes the front portion of the ladder screen to move relative to the rear portion of the ladder screen, which in turn tilts the slats in one direction or another.

In the example of FIG. 4 described above, the rotating of the lifting control shaft 2 is powered by the bead chain controller 26 (when a user pulls on the bead chain.) On the other hand, in the examples of FIGS. 14-16, the lifting control shaft 2 is powered by a power spring in a driving rod 9 or a spring controller 90 that is assembled with the lifting control shaft 2. The elastic force of the power spring is used to drive the lifting control shaft 2 to rotate to lift or release the slats of the blind. In some embodiments, a spring lift cord allows the user to rotate the lifting control shaft 2 and to wind or release the power spring. An additional reeling drum is installed on the lifting control shaft 2 for reeling the spring lift cord.

Figure 22:
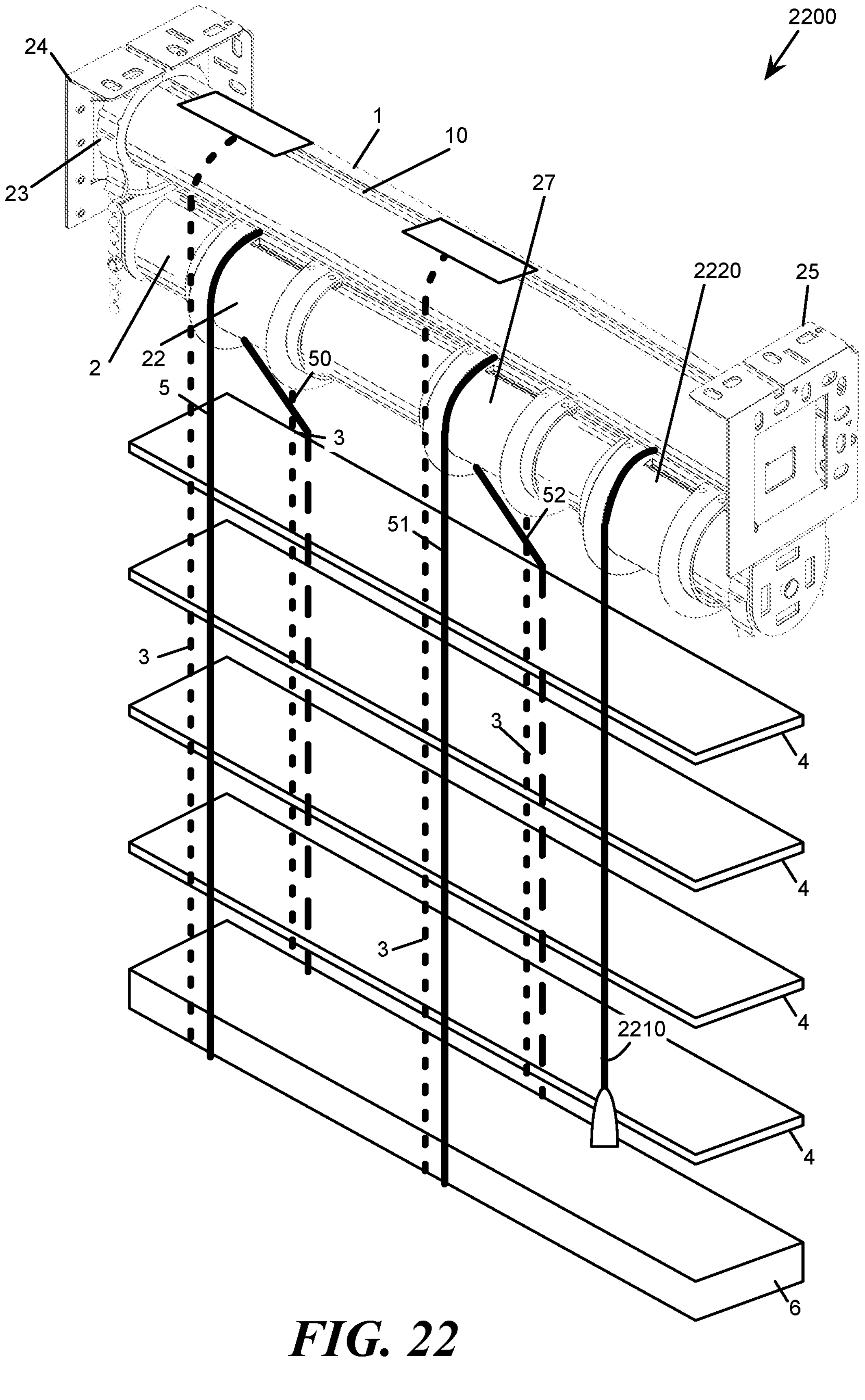
FIG. 22 illustrates a window blind that uses a spring lift cord for retracting and releasing slats.

FIG. 22 illustrates a window blind 2200 that uses a spring lift cord 2210 for retracting and releasing slats. The spring lift cord 2210 is used to control and power the rotation of the lifting control shaft 2. The spring lift cord 2210 is attached to the lifting control shaft 2. However, unlike the lifting cords 5, 50, 51, and 52 or the tiling cord 3, the spring lift cord 2210 is not connected to the blind bottom 6 or any of the slats 4.

As illustrated, the widow blind 2200 has the tilting control shaft 1 and the lifting control shaft 2. The rotation of the tilting control shaft 1 is powered by the bead controller 23. The rotation of the lifting control shaft 2 is powered by a power spring (internal to the lifting control shaft 2, not illustrated). The lifting control shaft 2 is sleeved with three reeling drums 22, 27, and 2220. The reeling drums 22 and 27 are used to reel the lifting cords 5, 50, 51, and 52, which are fastened to the blind bottom 6 for lifting the slats. The reeling drum 2220 is used to wind the spring lift cord 2210. In some embodiments, the reeling drum 2220 has a similar or an identical structure as that of the reeling drums 22 and 27. Specifically, the reeling drum 2220 has side guards to constrain the spring lift cord 2210.

Figure 23A:
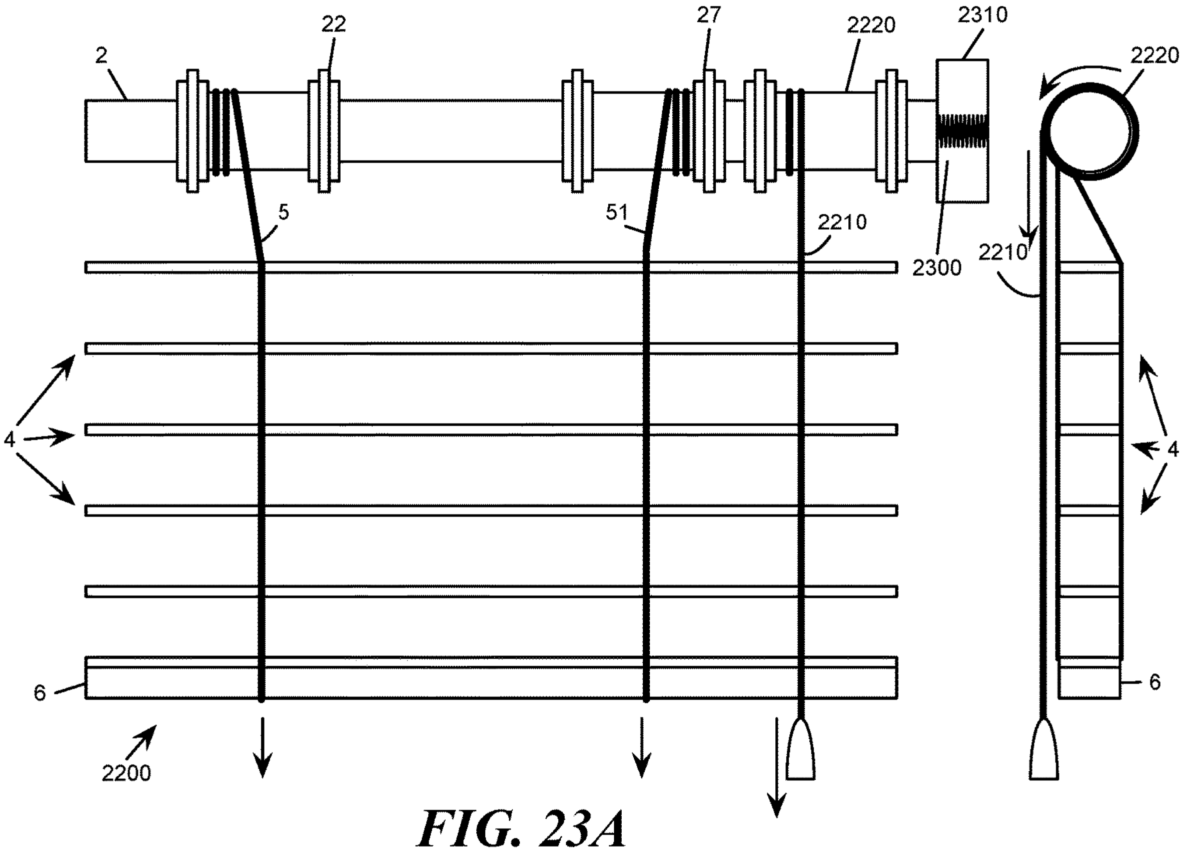
FIGS. 23A-B illustrate using the spring lift cord to retract and release the slats of the window blind.
Figure 23B:
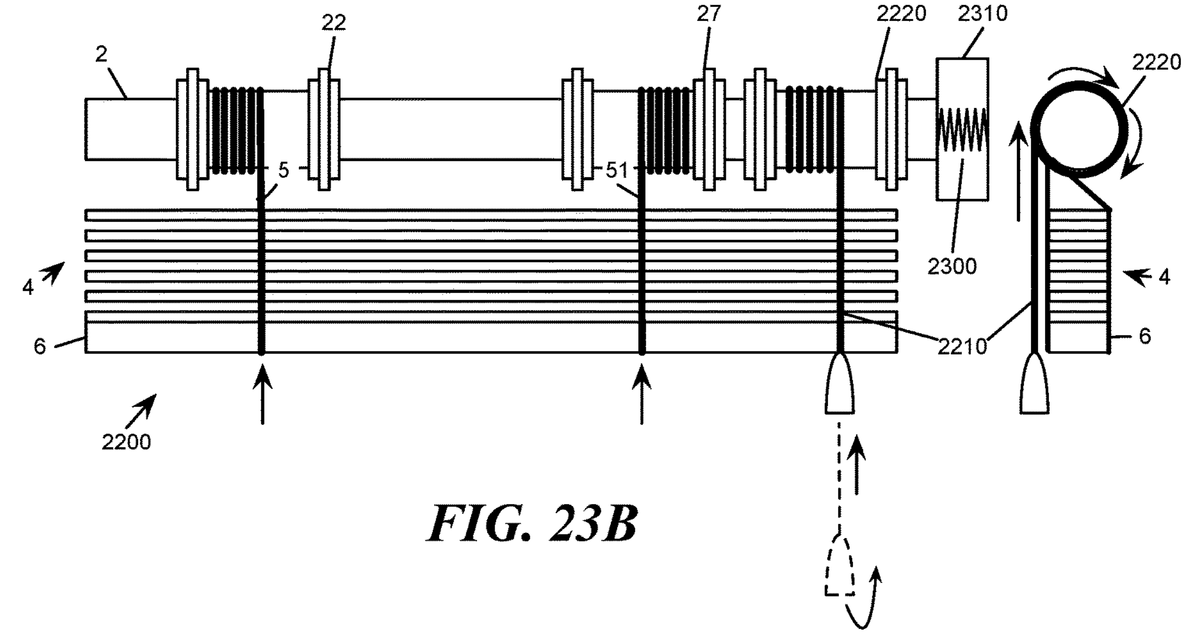

FIGS. 23A-B illustrate using the spring lift cord 2210 to retract and release the slats of the window blind 2200. FIG. 23A illustrates using the spring lift cord 2210 to release the slats. As illustrated, as the spring lift cord 2210 is pulled down, the reeling drum 2220 and the lifting control shaft 2 are driven to rotate. The rotation of the lifting control shaft 2 causes the lifting cords 5, 50, 51, and 52 to unwind from the reeling drums 22 and 27 and thereby release and lower the slats. The rotation of the lifting control shaft 2 also winds the power spring 2300 in a spring controller 2310 to store elastic energy.

FIG. 23B illustrates using the spring lift cord 2210 to retract the slats. As illustrated, as the user releases (by e.g., a jiggling motion) the spring lift cord 2210, the power spring 2300 is allowed to unwind to release the store elastic energy. The unwinding of the power spring 2300 powers the lifting control shaft 2 to rotate and retract/lift the slats of the window blind. As the lifting control shaft 2 rotates, the reeling drum 2220 also rotates to reel in the spring lift cord 2210.

As mentioned, the cross-sectional structure of the tilting control shaft 1 and/or the lifting control shaft 2 may be shaped as an arch, a fan, a semicircle, an arc, a circle, a triangle, a quadrangle, a pentagon, a hexagon, or any other two-dimensional shapes. It is empirically determined that using triangle-shaped shaft results in better rotational torque for lifting slats than using circle-shaped shaft. The triangle shape of the lifting control shaft 2402 is also observed to be more likely to maintain balance when reeling in the cords. It is also observed that manufacturing semicircle-shaped shafts saves material cost. This makes semicircle-shaped shafts feasible and economical as tilting control shafts since tilting slats does not require full rotation of the tilting control shaft. Thus, in some embodiments, the tilting control shaft has a semicircle-shaped cross-section and the lifting control shaft has a triangle-shaped cross-section.

Figure 24A:
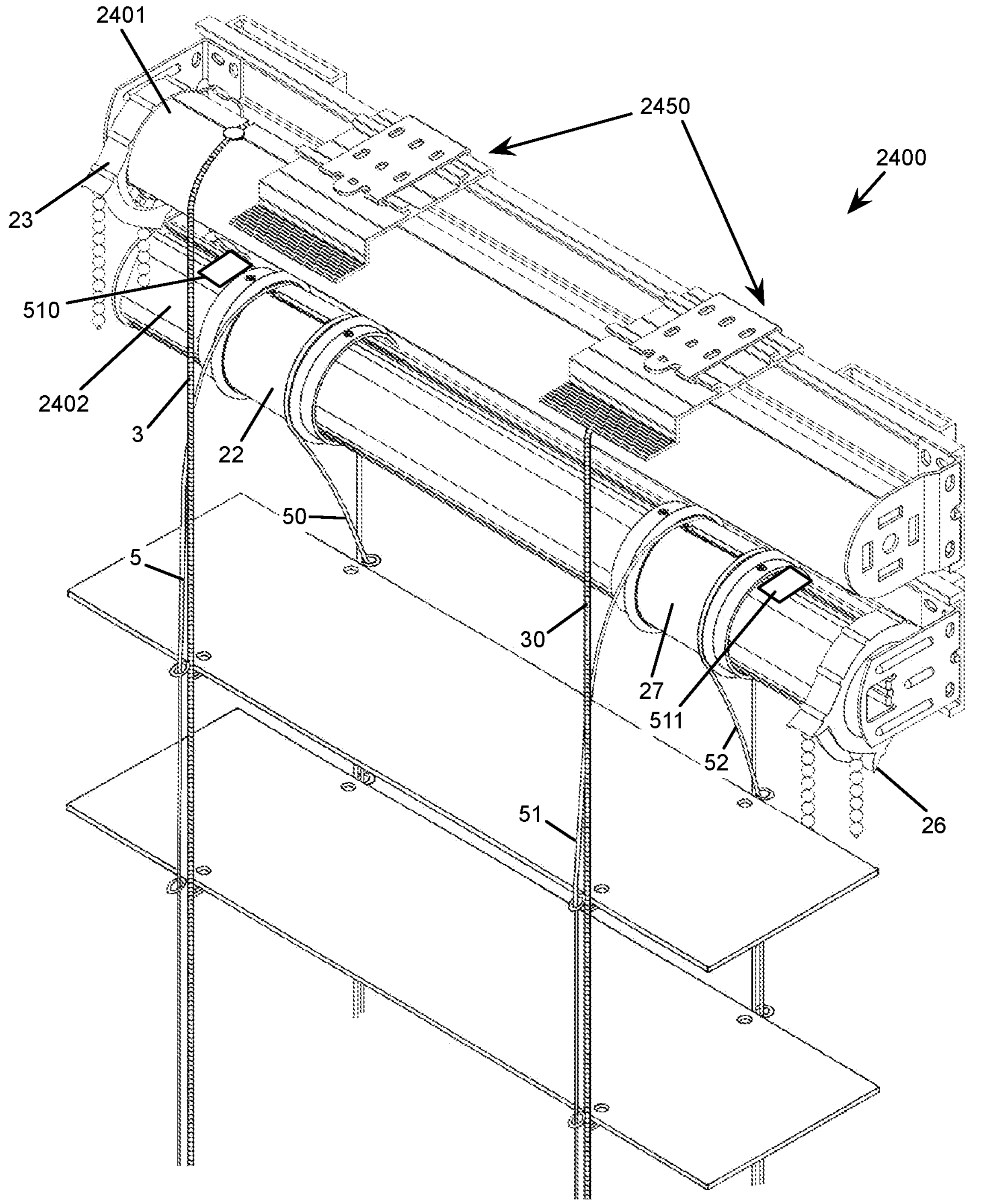
FIGS. 24A-B illustrate a window blind having a semi-circle-shaped tilting control shaft and a triangle-shaped lifting control shaft.

FIG. 24A illustrates a window blind 2400 having a semicircle-shaped tilting control shaft 2401 and a triangle-shaped lifting control shaft 2402. The semicircle-shaped tilting control shaft 2401 and the triangle-shaped lifting control shaft 2402 can be mounted to a wall or ceiling by a mounting assembly 2450. The semicircle-shaped tilting control shaft 2401 is rotated by the tilting bead chain controller 23 and the triangle-shaped lifting control shaft 2402 is rotated by the lifting bead chain controller 26. The tilting cords 3 and 30 are affixed to the semicircle-shaped tilting control shaft 2401 for tilting slats of the window blind 2400. The lifting cords 5, 50, 51, and 52 are affixed to the triangle-shaped lifting control shaft 2402 for lifting slats of the window blind 2400. The triangle-shaped lifting control shaft 2402 is sleeved with the reeling drums 22 and 27 for winding the lifting cords 5, 50, 51, and 52. Stoppers 510 and 511 are installed at the triangle-shaped lifting control shaft 2402 to limit the movement of the reeling drums 22 and 27. This allows the lifting cords to wrap around the reeling drums 22 and 27 in a stable manner.

Figure 24B:
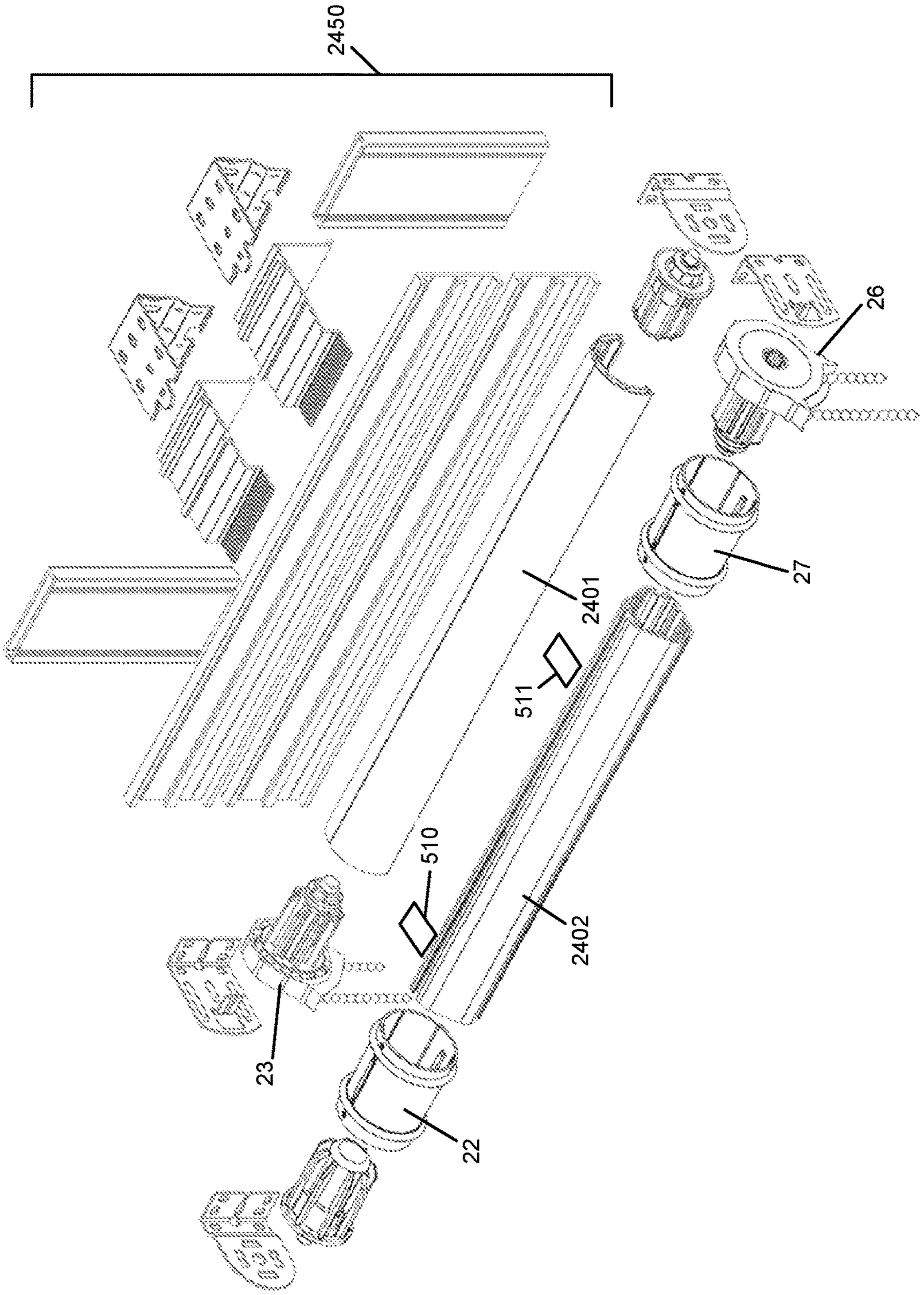

FIG. 24B shows an exploded view of window blind 2400 that includes the semicircle-shaped tilting control shaft 2401, the triangle-shaped lifting control shaft 2402, and the mounting assembly 2450. The slats, the lift bottom, the lifting cords, and the tilting cords are not illustrated.

Figure 25C:
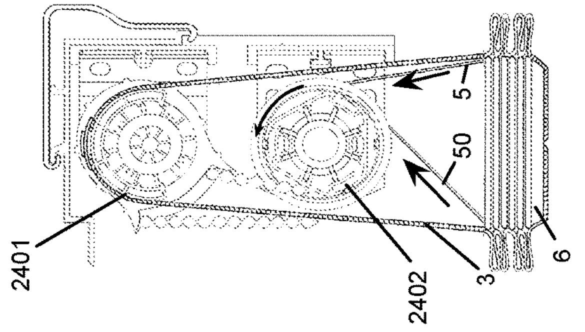
FIGS. 25A-C illustrate the lifting and the tilting of the slats of the window blind by using the semicircle-shaped tilting control shaft and the triangle-shaped lifting control shaft.
Figure 25B:
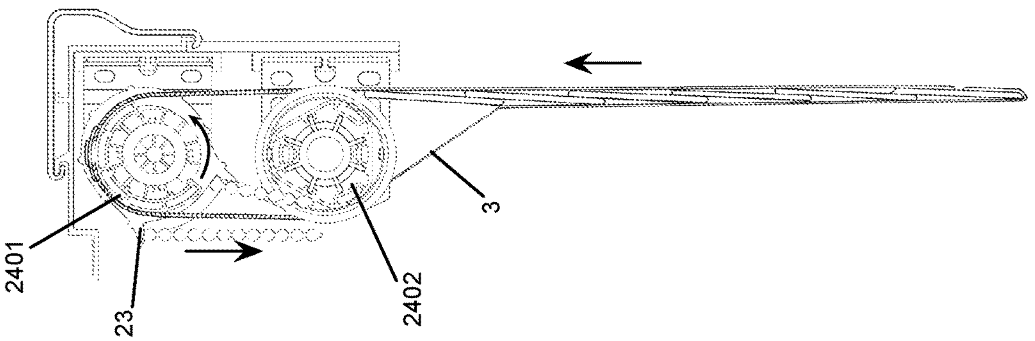
Figure 25A:
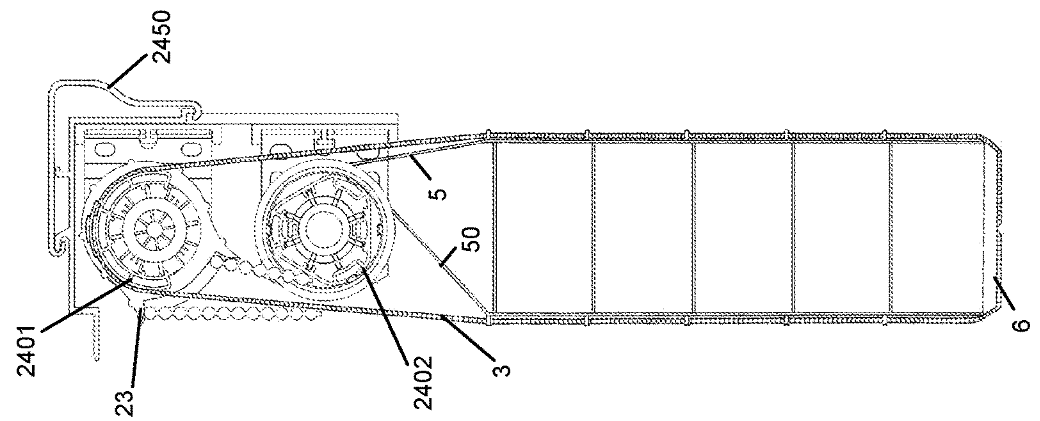

FIGS. 25A-C illustrate the lifting and the tilting of the slats of the window blind 2400 by using the semicircle-shaped tilting control shaft 2401 and the triangle-shaped lifting control shaft 2402. Specifically, FIG. 25A shows the slats of the window blind in a fully released state. FIG. 25B shows the slats of the window blind in a tilted state based on the rotation of the semicircle-shaped tilting control shaft 2401. FIG. 25C shows the slats of the window blind in retracted state based on the rotation of the triangle-shaped lifting control shaft 2402.

In some embodiments, both the tilting control shaft and the lifting control shaft have identical triangle-shaped cross-section. This has the advantage of lowering manufacturing cost as identical copies of the triangle-shaped shaft can be used for both tilting and lifting.

Figure 26A:
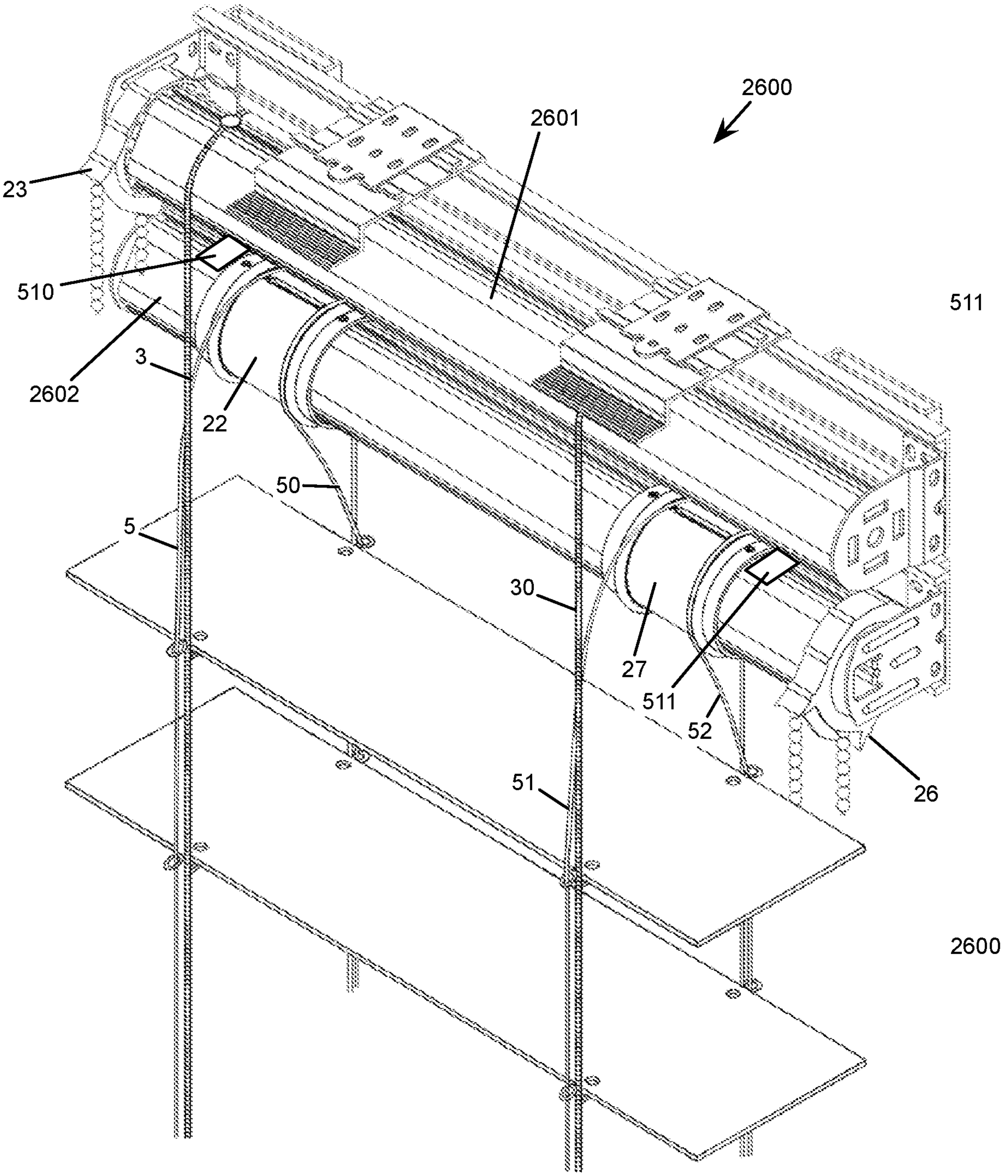
FIGS. 26A-B illustrate a window blind having a triangle-shaped tilting control shaft and a triangle-shaped lifting control shaft.
Figure 26B:
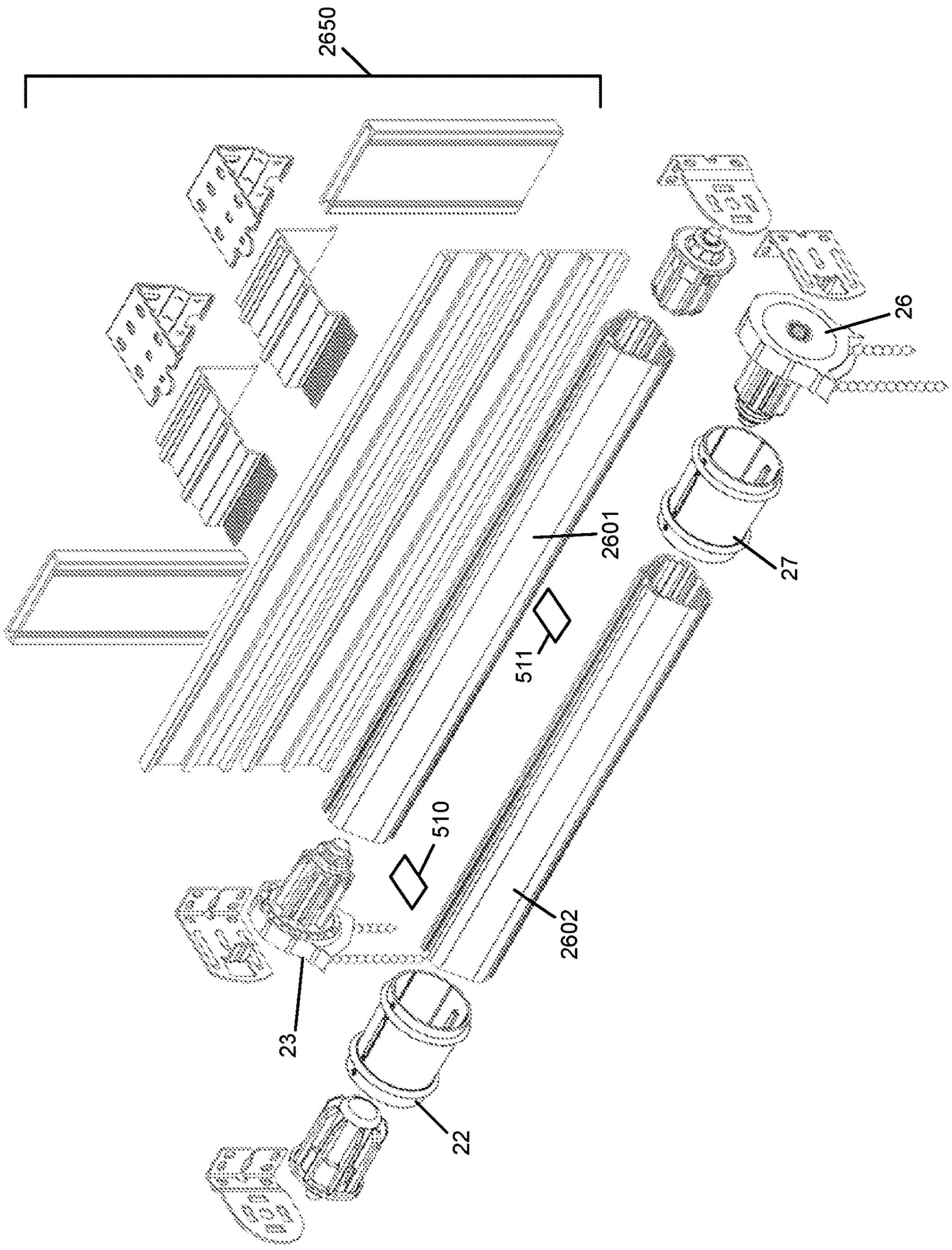

FIG. 26A illustrates a window blind 2600 having a triangle-shaped tilting control shaft 2601 and a triangle-shaped lifting control shaft 2602. The triangle-shaped tilting control shaft 2601 and the triangle-shaped lifting control shaft 2602 can be mounted to a wall or ceiling by a mounting assembly 2650. The triangle-shaped tilting control shaft 2601 is rotated by the tilting bead chain controller 23 and the triangle-shaped lifting control shaft 2602 is rotated by the lifting bead chain controller 26. The tilting cords 3 and 30 are affixed to the triangle-shaped tilting control shaft 2601 for tilting slats of the window blind 2600. The lifting cords 5, 50, 51, and 52 are affixed to the triangle-shaped lifting control shaft 2602 for lifting slats of the window blind 2600. The triangle-shaped lifting control shaft 2602 is sleeved with the reeling drums 22 and 27 for winding the lifting cords 5, 50, 51, and 52. Stoppers 510 and 511 are installed at the triangle-shaped lifting control shaft 2602 to limit the movement of the reeling drums 22 and 27. This allows the lifting cords to wrap around the reeling drums 22 and 27 in a stable manner. FIG. 26B shows an exploded view of window blind 2600 that includes the triangle-shaped tilting control shaft 2601, the triangle-shaped lifting control shaft 2602, and the mounting assembly 2650. The slats, the lift bottom, the lifting cords, and the tilting cords are not illustrated.

Figure 27C:
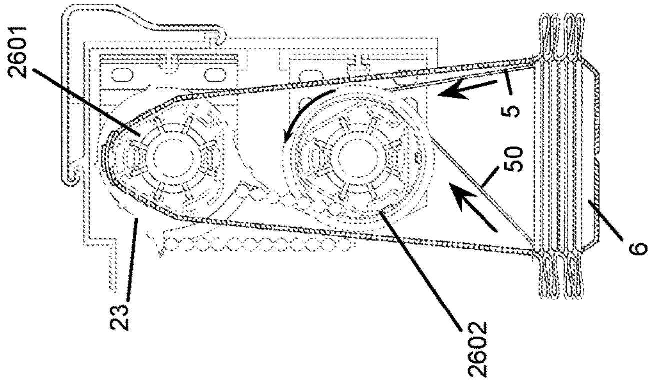
FIGS. 27A-C illustrate the lifting and the tilting of the slats of the window blind by using the triangle-shaped tilting control shaft and the triangle-shaped lifting control shaft.
Figure 27B:
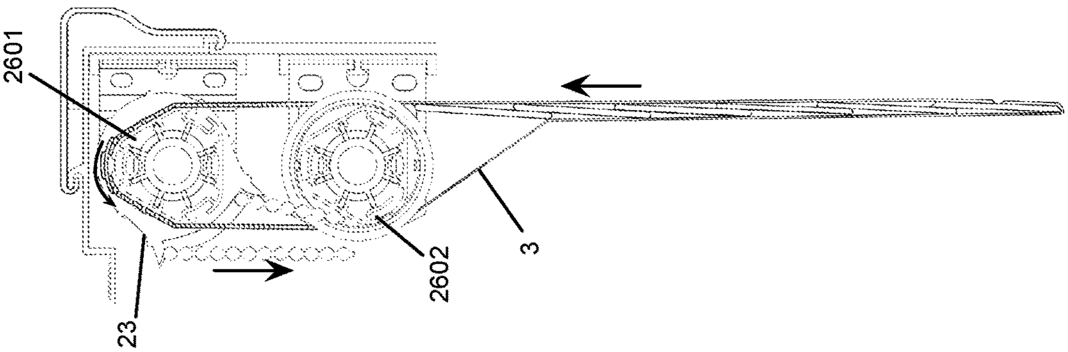
Figure 27A:
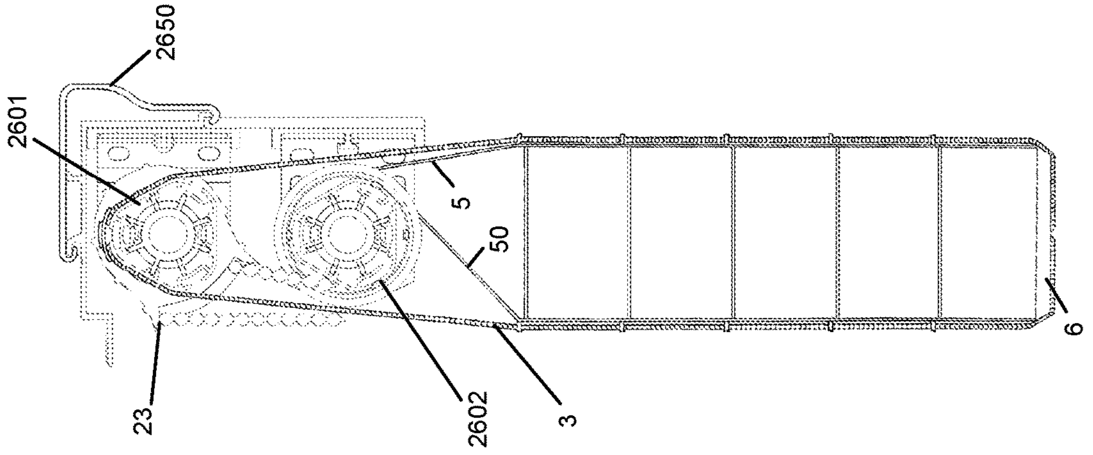

FIGS. 27A-C illustrate the lifting and the tilting of the slats of the window blind 2600 by using the triangle-shaped tilting control shaft 2601 and the triangle-shaped lifting control shaft 2602. Specifically, FIG. 27A shows the slats of the window blind in a fully released state. FIG. 27B shows the slats of the window blind in a tilted state based on the rotation of the triangle-shaped tilting control shaft 2601. FIG. 27C shows the slats of the window blind in retracted state based on the rotation of the triangle-shaped lifting control shaft 2602.

Figure 28A:
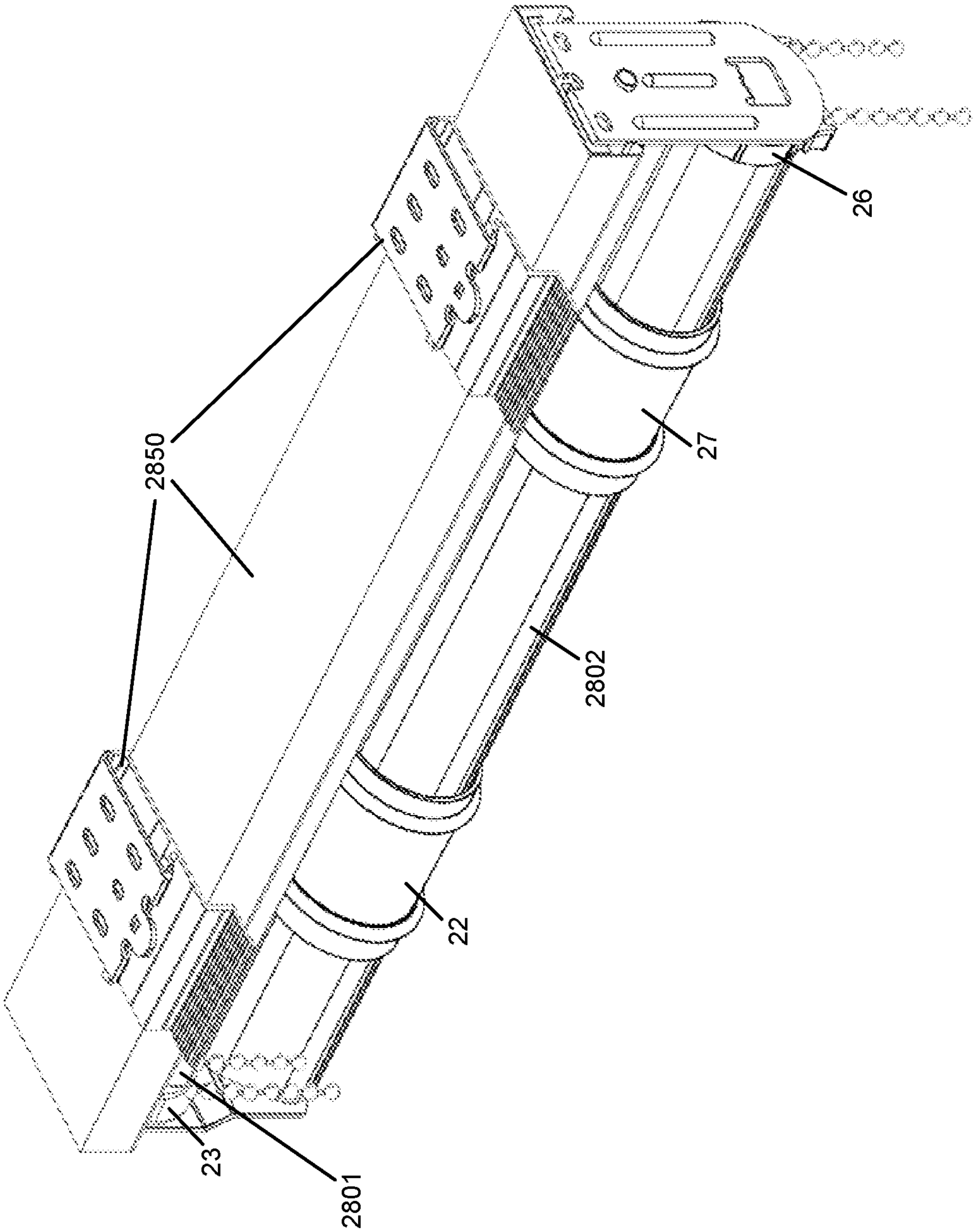
FIGS. 28A-B illustrate a window blind having a triangle-shaped tilting control shaft and a triangle-shaped lifting control shaft, with the cross-section of the tilting control shaft being smaller than the lifting control shaft.
Figure 28B:
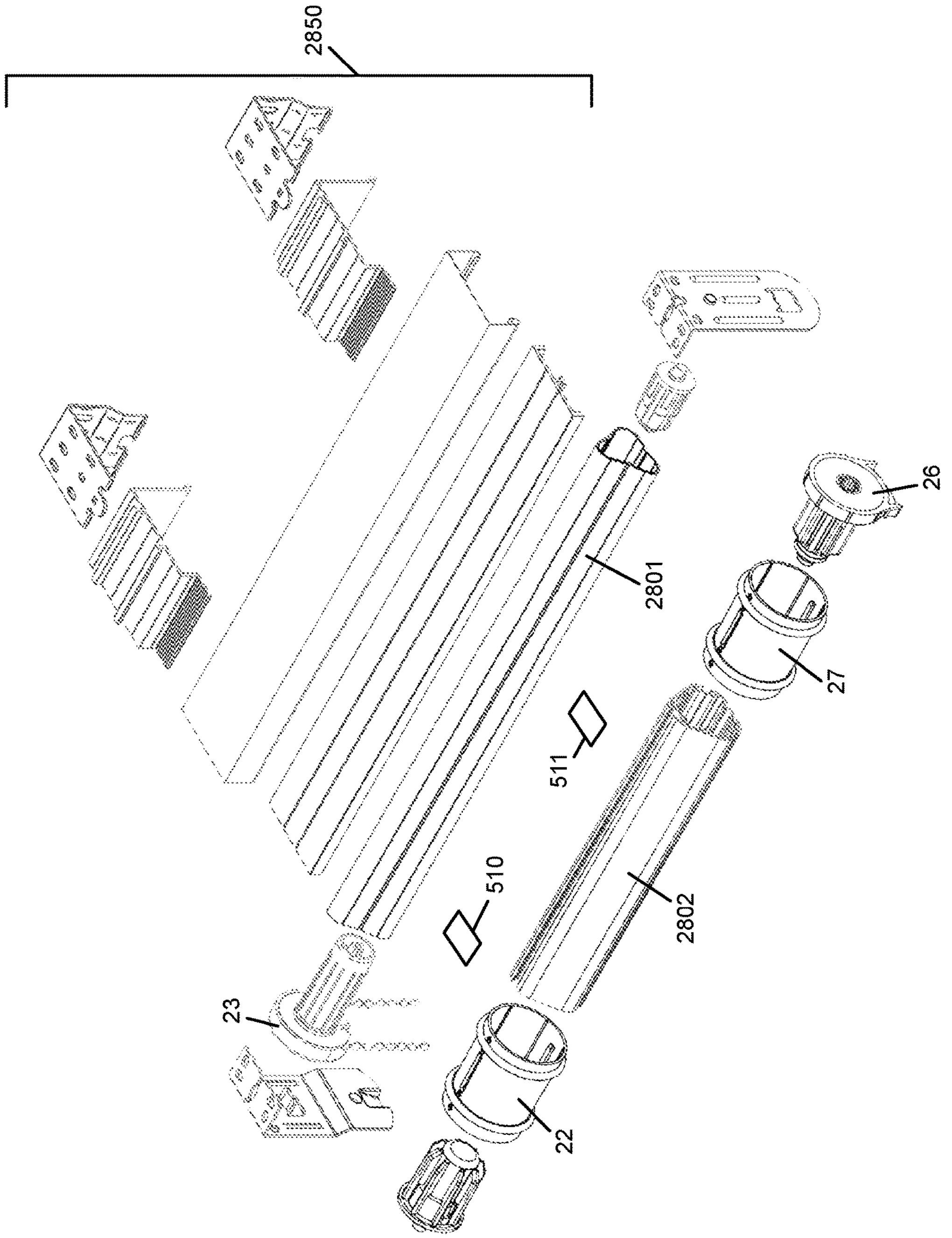

In some embodiments, both the lifting control shaft and the tilting control shaft have triangle-shaped cross-section, but the tilting control shaft has a smaller cross section than the lifting control shaft. This has the advantage of lowering material cost of manufacturing the lifting control shaft. FIG. 28A illustrates a window blind 2800 having a triangle-shaped tilting control shaft 2801 and a triangle-shaped lifting control shaft 2802, with the cross-section of the tilting control shaft 2801 being smaller than the lifting control shaft 2802. The triangle-shaped tilting control shaft 2801 and the triangle-shaped lifting control shaft 2802 can be mounted to a wall or ceiling by a mounting assembly 2850. The triangle-shaped tilting control shaft 2801 is rotated by the tilting bead chain controller 23 and the triangle-shaped lifting control shaft 2802 is rotated by the lifting bead chain controller 26. The triangle-shaped lifting control shaft 2802 is sleeved with the reeling drums 22 and 27. FIG. 28B shows an exploded view of window blind 2800 that includes the triangle-shaped tilting control shaft 2801, the triangle-shaped lifting control shaft 2802, and the mounting assembly 2850. The slats, the lift bottom, the lifting cords, and the tilting cords are not illustrated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:

a plurality of slats of a window blind;

a blind bottom that is positioned below the plurality of slats;

a tilting control shaft; a lifting control shaft;

a reeling drum sleeving the lifting control shaft, said reeling drum is slidable along the lifting control shaft during rotation of the lifting control shaft;

a ladder belt that is fastened to the tilting control shaft and interconnects the plurality of slats, wherein rotating the tilting control shaft tilts the plurality of slats; and a pair of lifting cords comprising a front lifting cord and a rear lifting cord, each cord having a first end fastened to the reeling drum and a second end connected to the blind bottom, wherein the front lifting cord is positioned beyond front edges of the plurality of slats and the rear lifting cord is positioned beyond rear edges of the plurality of slats, wherein rotating the lifting control shaft drives the reeling drum to wind or unwind the front and rear lifting cords to lift or lower the blind bottom and one or more slats in the plurality of slats.

2. The apparatus of claim 1, wherein the rotation of the tilting control shaft is controlled by a first bead chain controller and the rotation of the lifting control shaft is controlled by a second bead chain controller, wherein the first and second bead chain controllers are at opposite sides of the window blind.

3. The apparatus of claim 1, wherein the ladder belt is one of a plurality of ladder belts that are fastened to the tilting control shaft and interconnects the plurality of slats.

4. The apparatus of claim 1, wherein the ladder belt is a screen having a width that is substantially the same as the window blind and is translucent to permit passage of light.

5. The apparatus of claim 1, wherein the tilting control shaft is positioned above the lifting control shaft and the plurality of slats are positioned below the lifting control shaft.

6. The apparatus of claim 1, wherein the ladder belt is populated with loops through which the front and rear lifting cords thread through to reach the blind bottom.

7. The apparatus of claim 1, wherein the tilting control shaft has a semicircle-shaped cross-section and the lifting control shaft has a triangle-shaped cross-section.

8. The apparatus of claim 1, wherein the reeling drum comprises two side guards to confine the winding of the lifting cords to a range at the reeling drum.

9. The apparatus of claim 1, wherein the lifting control shaft comprises a position groove and the reeling drum comprises a protrusion piece that recess into the position groove.

10. The apparatus of claim 1, wherein the front and rear lifting cords are fastened to two opposite ends of the reeling drum.

11. The apparatus of claim 1, wherein the reeling drum has an inclined surface to guide the winding of the lifting cords.

12. The apparatus of claim 1, wherein the tilting control shaft and the lifting control shaft have cross-section diameters that are substantially the same.

13. The apparatus of claim 1, wherein the pair of front and rear lifting cords are one pair of a plurality of pairs of front and rear lifting cords that are fastened to a plurality of reeling drums sleeving the lifting control shaft.

14. The apparatus of claim 1, wherein the ladder belt is positioned to align with one of the reeling drum.

15. The apparatus of claim 14, wherein a second reeling drum is for reeling a spring lift cord, said spring lift cord is not coupled to the blind bottom, wherein pulling the spring lift cord rotates the lifting control shaft to wind a power spring and lower the plurality of slats, wherein releasing the spring lift cord unwinds the power spring and drives the lifting control shaft to rotate and lift the plurality of slats.

16. The apparatus of claim 1, wherein a stopper is fastened to the lifting control shaft to limit the movement of the reeling drum.

17. The apparatus of claim 16, wherein the reeling drum has a conic structure with a wider end and a narrower end, wherein the front and rear lifting cords are fastened to the wider end of the reeling drum and the stopper is abutting the narrower end of the reeling drum.

18. An apparatus comprising:

a plurality of slats of a window blind;

a blind bottom that is positioned below the plurality of slats;

a tilting control shaft; a lifting control shaft;

one or more reeling drums sleeving the lifting control shaft, said reeling drums are slidable along the lifting control shaft during rotation of the lifting control shaft;

a ladder belt that is fastened to the tilting control shaft and interconnects the plurality of slats, wherein rotating the tilting control shaft tilts the plurality of slats; and a pair of lifting cords comprising a front lifting cord and a rear lifting cord, each cord having a first end fastened to a same reeling drum of the one or more reeling drums and a second end connected to the blind bottom, wherein the front lifting cord is positioned beyond front edges of the plurality of slats and the rear lifting cord is positioned beyond rear edges of the plurality of slats, wherein rotating the lifting control shaft drives the reeling drum to wind or unwind the front and rear lifting cords to lift or lower the blind bottom and one or more slats in the plurality of slats.

* * * * *